US012771580B2

(12) United States Patent
Park et al.

(10) Patent No.: US 12,771,580 B2
(45) Date of Patent: Oct. 20, 2026

(54) RECEIVER INCLUDING NEGATIVE COVARIANCE GENERATION FILTER AND ELECTRONIC DEVICE INCLUDING THE SAME

(71) Applicant: SAMSUNG ELECTRONICS CO., LTD., Suwon-si (KR)

(72) Inventors: Seung Park, Suwon-si (KR); Jung-Hoon Chun, Suwon-si (KR)

(73) Assignee: SAMSUNG ELECTRONICS CO., LTD. & RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 19/087,053

(22) Filed: Mar. 21, 2025

(65) Prior Publication Data

US 2025/0323810 A1 Oct. 16, 2025

(30) Foreign Application Priority Data

Apr. 12, 2024 (KR) ........................ 10-2024-0049618
Jun. 10, 2024 (KR) ........................ 10-2024-0074992

(51) Int. Cl.

| | |
|---|---|
| ***H04L 25/03*** | (2006.01) |
| ***H04L 7/00*** | (2006.01) |
| ***H04L 25/49*** | (2006.01) |

(52) U.S. Cl.

CPC ...... *H04L 25/03057* (2013.01); *H04L 7/0025* (2013.01); *H04L 25/4917* (2013.01)

(58) Field of Classification Search

CPC ............. H04L 25/03057; H04L 7/0025; H04L 25/4917; H04L 25/03012; H04L 2025/03445; H03H 17/0248

See application file for complete search history.

(56) References Cited

U.S. PATENT DOCUMENTS

| | | | | |
|---|---|---|---|---|
| 5,223,989 | A * | 6/1993 | Craig | G11B 20/10203 360/39 |
| 8,891,709 | B2 | 11/2014 | Kolze et al. | |
| 9,619,227 | B2 | 4/2017 | Khan et al. | |
| 9,851,825 | B2 | 12/2017 | Kim et al. | |
| 10,318,035 | B2 | 6/2019 | Lee et al. | |

(Continued)

FOREIGN PATENT DOCUMENTS

| | | | |
|---|---|---|---|
| JP | 5316375 | B2 | 10/2013 |
| KR | 10-2015-0062011 | A | 6/2015 |

(Continued)

*Primary Examiner* — Jean B Corrielus

(74) *Attorney, Agent, or Firm* — Fish & Richardson P.C.

(57) ABSTRACT

Disclosed is a receiver including a pre-processing block that pre-processes a received signal transmitted from an external transmitter and generates a pre-processing signal, an equalization block that generates an equalization signal based on the pre-processing signal and error threshold values, and a threshold generation block that generates the error threshold values and data threshold values. The threshold generation block generates a delay signal obtained by delaying the equalization signal by a unit time interval, generates a filter signal based on subtracting the delay signal from the equalization signal, and generates the error threshold values and the data threshold values based on the filter signal.

20 Claims, 21 Drawing Sheets

(56) References Cited

U.S. PATENT DOCUMENTS

| | | | | |
|---|---|---|---|---|
| 11,035,940 | B2 | 6/2021 | Xu et al. | |
| 11,070,297 | B2 | 7/2021 | Azenkot | |
| 11,588,453 | B2 | 2/2023 | Kim et al. | |
| 2007/0076820 | A1 * | 4/2007 | Kao ......................... | H03D 1/04 375/322 |
| 2014/0241412 | A1 | 8/2014 | Kalbasi et al. | |

FOREIGN PATENT DOCUMENTS

| | | | |
|---|---|---|---|
| KR | 10-2015-0121201 | A | 10/2015 |
| KR | 10-2015-0125129 | A | 11/2015 |

* cited by examiner

FIG. 6A

| Amplitude | Probability | Absolute Amp. | Multiple |
|---|---|---|---|
| 3 (A4) | 1/4 | 3 | 3/4 |
| 1 (A3) | 1/4 | 1 | 1/4 |
| -1 (A2) | 1/4 | 1 | 1/4 |
| -3 (A1) | 1/4 | 3 | 3/4 |

FIG. 6B

| Amplitude | Probability | Absolute Amp. | Multiple |
|---|---|---|---|
| 6 (D7) | 1/16 | 6 | 6/16 |
| 4 (D6) | 2/16 | 4 | 8/16 |
| 2 (D5) | 3/16 | 2 | 6/16 |
| 0 (D4) | 4/16 | 0 | 0 |
| -2 (D3) | 3/16 | 2 | 6/16 |
| -4 (D2) | 2/16 | 4 | 8/16 |
| -6 (D1) | 1/16 | 6 | 6/16 |

RECEIVER INCLUDING NEGATIVE COVARIANCE GENERATION FILTER AND ELECTRONIC DEVICE INCLUDING THE SAME

CROSS-REFERENCE TO RELATED APPLICATIONS

This application claims priority under 35 U.S.C. § 119 to Korean Patent Application No. 10-2024-0049618, filed on Apr. 12, 2024, and No. 10-2024-0074992, filed on Jun. 10, 2024, in the Korean Intellectual Property Office, the disclosures of which are incorporated by reference herein in their entireties.

BACKGROUND

Various schemes are used to transmit data in wired or wireless communication between electronic devices. Through some of the schemes, the electronic devices may communicate with each other by using a symbol corresponding to the value of data. Because a signal within a channel may be lost as a communication channel between the electronic devices becomes longer or a communication speed increases, the transmitted symbol may not be completely delivered to an electronic device. For example, original signals may be lost due to an inter-symbol interference (ISI) caused by an increase in communication speed.

A receiver may include an equalizer to restore the transmitted signal based on a signal that is lost due to the ISI or noise. The equalizer may restore the received signal based on a threshold value.

SUMMARY

Some implementations according to the present disclosure provide receivers capable of quickly and accurately restoring transmission signals lost due to ISI or noise, and quickly and accurately calculating threshold values for restoring signals, e.g., even when an eye on an eye diagram is closed.

According to some implementations, a receiver includes a pre-processing block that pre-processes a received signal transmitted from an external transmitter and generates a pre-processing signal, an equalization block that generates an equalization signal based on the pre-processing signal and error threshold values, and a threshold generation block that generates the error threshold values and data threshold values. The threshold generation block generates a delay signal obtained by delaying the equalization signal by a unit time interval, generates a filter signal based on subtracting the delay signal from the equalization signal, and generates the error threshold values and the data threshold values based on the filter signal.

According to some implementations, an operating method of a receiver includes generating a pre-processing signal by pre-processing a received signal received from an external device, generating a filter signal from the pre-processing signal, generating error threshold values and data threshold values based on the filter signal, and performing an equalizing operation of the pre-processing signal based on the error threshold values. The filter signal is generated based on subtracting a delay signal, which is obtained by delaying the pre-processing signal by a unit time interval, from the pre-processing signal.

According to some implementations, an electronic device includes a functional module that controls the electronic device and performs a function of the electronic device, a buffer module that stores data and a program necessary for an operation of the functional module, and a communication module that communicates with another electronic device and including a transmitter and a receiver. The receiver includes a pre-processing block that pre-processes a received signal transmitted to the electronic device and to generate a pre-processing signal, an equalization block that generates an equalization signal based on the pre-processing signal and error threshold values, and a threshold generation block that generates the error threshold values and data threshold values. The threshold generation block generates a delay signal obtained by delaying the equalization signal by a unit time interval, generates a filter signal based on subtracting the delay signal from the equalization signal, and generates the error threshold values and the data threshold values based on the filter signal.

According to some implementations, a receiver includes a pre-processing block that pre-processes a received signal transmitted from an external transmitter and generates a pre-processing signal, an equalization block that generates an equalization signal based on the pre-processing signal and error threshold values, and a threshold generation block that generates a filter signal from the equalization signal and generates the error threshold values and data threshold values based on the filter signal. The filter signal includes a first symbol at a first time point, and a second symbol at a second time point. The second time point is an immediately-preceding time point of the first time point, and the first symbol and the second symbol have a negative covariance relation with each other.

BRIEF DESCRIPTION OF THE DRAWINGS

The above and other objects and features of the present disclosure will become apparent by describing in detail examples thereof with reference to the accompanying drawings.

FIG. 6A is a table showing an example of a process of obtaining a probability of a transmission signal and an average value of amplitude of a transmission signal.

FIG. 6B is a table showing an example of a process of obtaining a probability of a difference signal and an average value of amplitude of the difference signal.

DETAILED DESCRIPTION

As used throughout the detailed description, components described with reference to the terms "unit", "module", "block", "~er or ~or", etc. and function blocks illustrated in drawings will be implemented with software, hardware, or a combination thereof. For example, the software may be a machine code, firmware, an embedded code, and application software. For example, the hardware may include an electrical circuit, an electronic circuit (an analog circuit or a digital circuit), a processor, a computer, an integrated circuit, integrated circuit cores, a pressure sensor, an inertial sensor, a microelectromechanical system (MEMS), a passive element, or a combination thereof.

Figure 1:
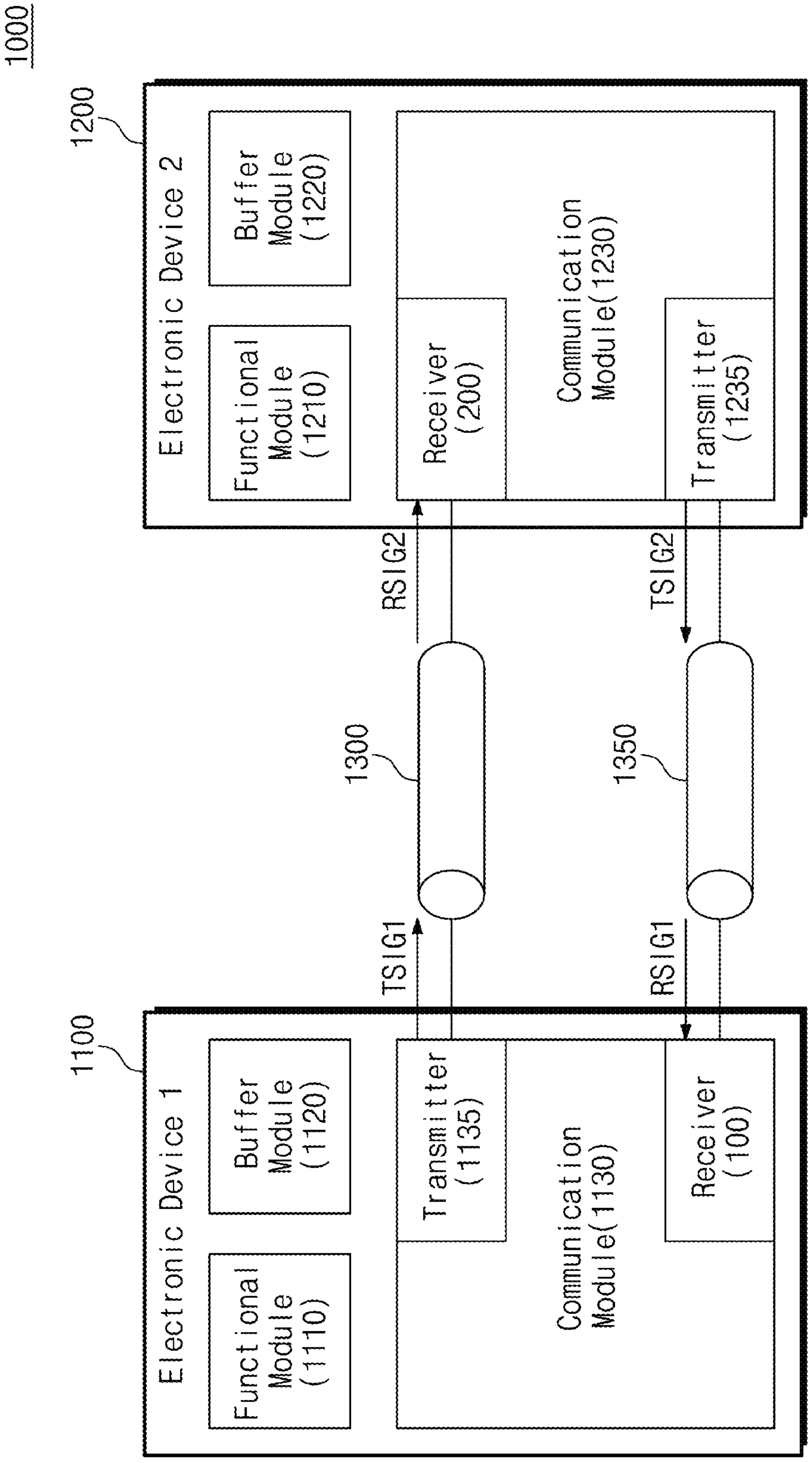
FIG. 1 is a block diagram showing an example of a electronic system.

FIG. 1 is a block diagram showing an electronic system according to some implementations of the present disclosure. Referring to FIG. 1, an electronic system 1000 may include a first electronic device 1100, a second electronic device 1200, a first channel 1300, and a second channel 1350.

The first electronic device 1100 and the second electronic device 1200 may be electronic devices configured to perform various functions. For example, each of the first electronic device 1100 and the second electronic device 1200 may be a computer, a laptop computer, a tablet computer, a personal digital assistant (PDA), a camera, an electronic control unit (ECU), a storage device, a memory device, a data center, etc. As a more detailed example, the electronic system 1000 may be a storage system; the first electronic device 1100 may be a host; and the second electronic device 1200 may be a storage device.

The first electronic device 1100 may include a functional module 1110, a buffer module 1120, and a communication module 1130. The communication module 1130 may include a transmitter 1135 and a receiver 100. Likewise, the second electronic device 1200 may include a functional module 1210, a buffer module 1220, and a communication module 1230. The communication module 1230 may include a transmitter 1235 and a receiver 200. Hereinafter, each of the configurations is described based on the first electronic device 1100. The configuration of the second electronic device 1200 may be the same as or similar to the corresponding configuration of the first electronic device 1100, respectively, and the second electronic device 1200 may operate identically or similarly to the operations of the first electronic device 1100, except where noted otherwise or suggested otherwise by context.

The functional module 1110 may control the overall operations of the first electronic device 1100. In some implementations, the functional module 1110 includes at least one processor. For example, the functional module 1110 may include a central processing unit (CPU) and may further include an accelerator such as a graphics processing unit (GPU) or a neural processing unit (NPU).

In some implementations, the functional module 1110 causes the first electronic device 1100 to perform various operations. For example, the functional module 1110 may cause the first electronic device 1100 to perform an operation, which is indicated by a source code or a program, by executing the source code or the program stored in the buffer module 1120. In some implementations, the functional module 1110 includes configurations for the function or operation of the first electronic device 1100. For example, when the first electronic device 1100 is a camera, the functional module 1110 may further include a lens or a CIS sensor necessary for the operation of the first electronic device 1100. As another example, the first electronic device 1100 may further include a user interface for providing information to a user or receiving an input from a user.

The buffer module 1120 may store data used for the operation of the first electronic device 1100. For example, the buffer module 1120 may store the source code used for the operation of the first electronic device 1100, or data used to execute the source code. In some implementations, the buffer module 1120 includes at least one or more memory devices or storage devices. For example, the buffer module 1120 may include at least one or more of a volatile memory device such as static random access memory (SRAM) or dynamic RAM (DRAM), or a non-volatile memory device.

The communication module 1130 may perform communication between electronic devices. In some implementations, the communication module 1130 supports wired communication. For example, wired communication between the first electronic device 1100 and other electronic devices (e.g., the second electronic device 1200) may be performed through the communication module 1130.

The transmitter 1135 may transmit data to the other electronic devices. In some implementations, the transmitter 1135 may transmit data in a symbol form. In some implementations, a transmission signal TSIG transmitted by the transmitter 1135 may include at least one or more symbols. For example, the transmitter 1135 may transmit a first transmission signal TSIG1 to the second electronic device 1200 through the first channel 1300.

In some implementations, the transmitter 1135 may generate the first transmission signal TSIG1 based on control or data received from the functional module 1110 or the buffer module 1120. For example, the transmitter 1135 may generate a plurality of symbols based on data received from the functional module 1110 or the buffer module 1120 and may generate the first transmission signal TSIG1 including the plurality of symbols. In some implementations, the transmitter 1135 transmits the first transmission signal TSIG1 received from the functional module 1110 to the other electronic devices. In some implementations, the transmitter 1135 includes a serializer. In some implementations, the transmitter 1135 generates the first transmission signal TSIG1 based on data received from the serializer.

The receiver 100 may receive a first received signal RSIG1. The first received signal RSIG1 may be a signal generated as the transmission signal of another electronic device passes through channels. For example, the first received signal RSIG1 may be a signal generated as a second transmission signal TSIG2 transmitted by the second electronic device 1200 passes through the second channel 1350. In some implementations, the first received signal RSIG1 includes a plurality of symbols. In some implementations, the receiver 100 generates data based on at least one or more symbols included in the first received signal RSIG1. For example, the receiver 100 may receive the first received signal RSIG1 generated based on the second transmission signal TSIG2 transmitted by the second electronic device 1200, and may generate data, which is included in the symbols included in the first received signal RSIG1, or is indicated by the symbols.

The receiver 100 may restore the transmission signal. In some implementations, the receiver 100 may restore the second transmission signal TSIG2 from the first received signal RSIG1 generated as the second transmission signal TSIG2 passes through the channel 1350. "The restoring of a transmission signal TSIG" used throughout this specification may refer to or include: 1) processing, manipulating, modulating, or transforming the received signals RSIG1 and RSIG2, or signals generated based on the received signals RSIG1 and RSIG2, such that the pieces of amplitude or waveforms of the signals are the same as or similar to those of the transmission signals TSIG1 and TSIG2; 2) processing, manipulating, modulating, or transforming the received signals RSIG1 and RSIG2, or the signals generated based on the received signals RSIG1 and RSIG2 to the extent to which symbols (e.g., symbols generated based on data) included in the transmission signals TSIG1 and TSIG2 are determined and data included in the transmission signals is identified or determined; 3) processing, manipulating, modulating, or transforming the received signals RSIG1 and RSIG2, or the signals generated based on the received signals RSIG1 and RSIG2, to the extent to which data included in the transmission signals TSIG1 and TSIG2 is identified or determined; and/or 4) operations similar thereto. In some implementations, the receiver 100 delivers data generated based on the first received signal RSIG1 to the functional module 1110 or the buffer module 1120.

In some implementations, the form of at least one symbol included in the transmission signals TSIG1 and TSIG2 may differ depending on a data coding scheme of the electronic system 1000, the first electronic device 1100, or the transmitter 1135. For example, the symbols included in the transmission signals TSIG1 and TSIG2 may be generated from data based on a pulse code modulation (PCM) scheme. As another example, symbols included in the transmission signals TSIG1 and TSIG2 may be generated from data based on the PWM scheme. As a detailed example, at least one symbol included in the transmission signals TSIG1 and TSIG2 may be generated based on at least one of a non-return to zero (NRZ) scheme, a pulse amplitude modulation-N(PAM-N) scheme, a bi-polar scheme, or a Manchester scheme. In some implementations, the transmission signals TSIG1 and TSIG2 may be signals to which pre-distortion is applied. For example, the transmitter 1135 may include a feed-forward equalizer (FFE) to apply the pre-distortion to the transmission signals TSIG1 and TSIG2.

The coding scheme of at least one symbol included in the received signals RSIG1 and RSIG2 may be the same as the coding scheme of the transmission signals TSIG1 and TSIG2 on which the received signals RSIG1 and RSIG2 are based. Examples of the transmission signals TSIG1 and TSIG2 are described in more detail with reference to FIGS. 2A and 2B. The received signals RSIG1 and RSIG2 are described in more detail with reference to FIG. 2E. In some implementations, the transmission signals TSIG1 and TSIG2 are random signals, or have characteristics the same as or similar to those of random signals. Likewise, the received signals RSIG1 and RSIG2, which are generated based on the transmission signals TSIG1 and TSIG2, may also be random signals, or may have characteristics the same as or similar to those of the random signals.

The channels 1300 and 1350 may be pathways for communication between the electronic devices 1100 and 1200. In some implementations, each of the channels 1300 and 1350 is a wired communication channel. For example, the first channel 1300 and the second channel 1350 may be wired communication channels and may be pathways for communication between the first electronic device 1100 and the second electronic device 1200. As a more detailed example, the channels 1300 and 1350 may be implemented as a waveguide, a transmission line, a strip line, a micro strip line, or any combination thereof. Hereinafter, it will be described that the channels 1300 and 1350 are wired communication channels. However, the scope of the present disclosure is not limited thereto. For example, it should be understood that, in some implementations of the present disclosure, the channels 1300 and 1350 are wireless communication channels, and the devices and processes described herein are also applicable to that case. The characteristics of each of the channels 1300 and 1350 are described in more detail with reference to FIG. 2C.

Figure 3:
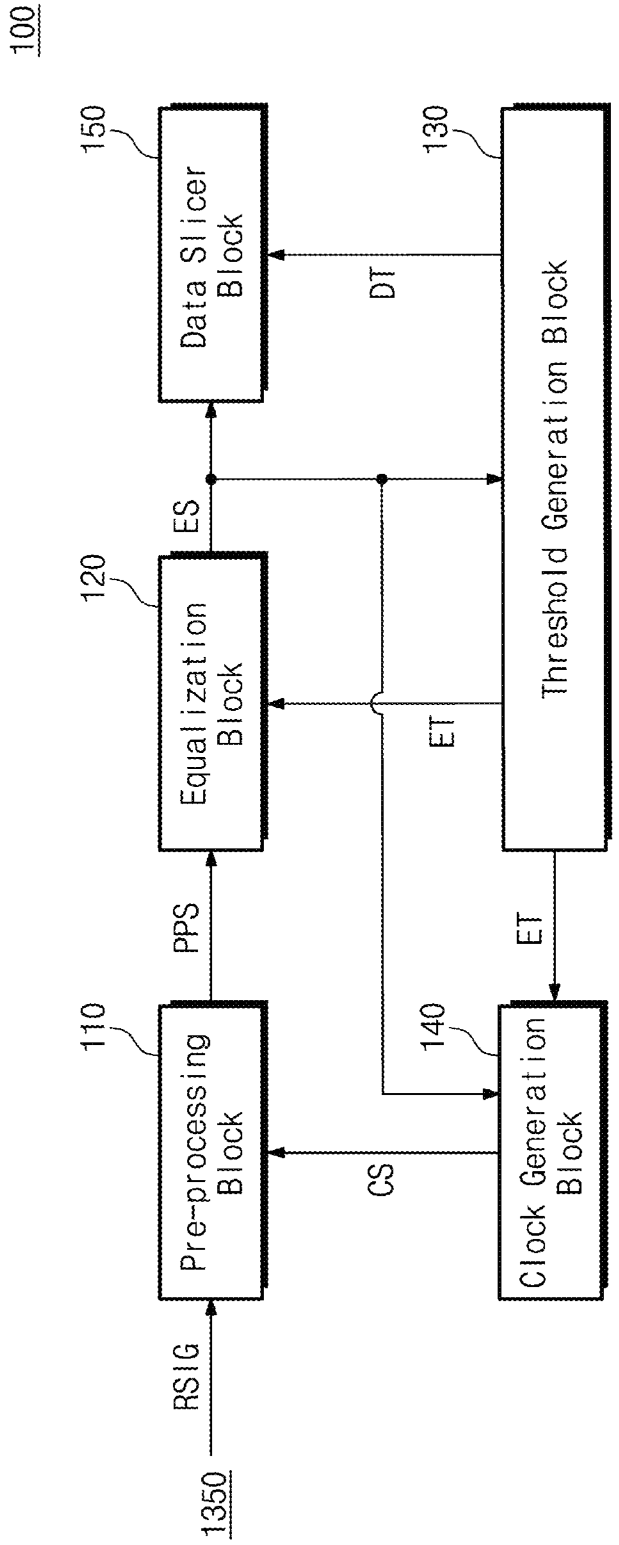
FIG. 3 is a block diagram showing an example of a receiver.
Figure 4:
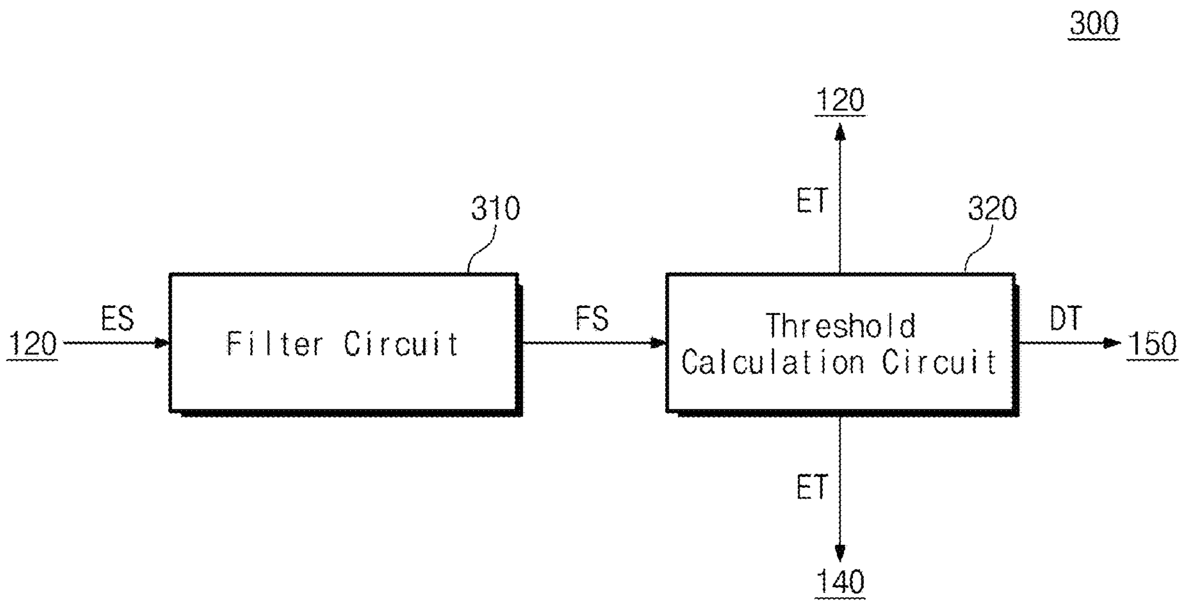
FIG. 4 is a block diagram showing an example of a threshold generation block.

The receiver 100 according to some implementations of the present disclosure may receive a received signal RSIG and may filter the received signal RSIG to generate a filter signal (e.g., a filter signal FS in FIG. 4). In some implementations, the receiver 100 generates a plurality of threshold values (e.g., an error threshold ET such as in FIG. 3 or a data threshold DT such as in FIG. 3) for determining data included in the received signal RSIG, based on the filter signal. Even in situations where the ISI of the received signal RSIG is severe, the receiver 100 may quickly and accurately generate several threshold values, based on the filter signal, thereby improving the performance of the electronic device 1100. The receiver 100 will be described in more detail with reference to FIGS. 3 to 15.

FIGS. 2A to 2E are diagrams showing examples of the transmission signals TSIG1 and TSIG2 of FIG. 1, the received signals RSIG1 and RSIG2 of FIG. 1, and ISI.

Figure 2A:
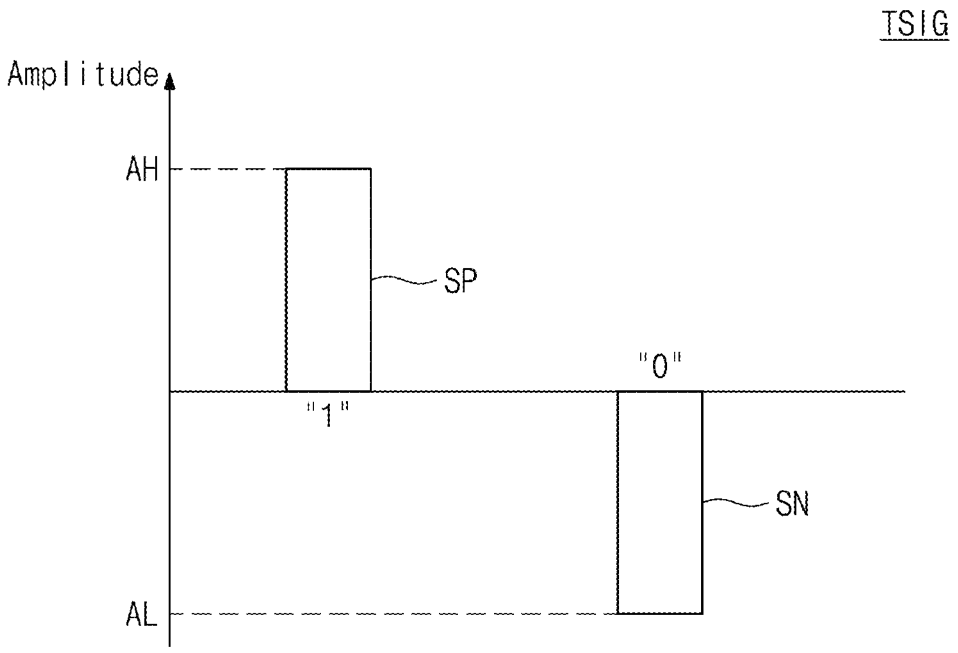
FIGS. 2A to 2E are diagrams showing examples of the transmission signals of FIG. 1, the received signals of FIG. 1, and ISI.

FIG. 2A shows examples of symbols included in the transmission signal TSIG. The transmission signal TSIG may be the transmission signal TSIG1 or TSIG2 of FIG. 1, or may be similar to the transmission signal TSIG1 or TSIG2 of FIG. 1. In some implementations, the transmission signal TSIG may include two symbols. In some implementations, the transmission signal TSIG of FIG. 2A may include symbols obtained by encoding data in a NRZ scheme. For example, symbols SP and SN of the transmission signal TSIG may correspond to data of 1-bit length.

For example, referring to FIG. 2A, the positive symbol SP may correspond to a value of logic 1 and may be a symbol with first amplitude AH. In some implementations, for example, the symbols SP and SN may be impulses with levels of the symbols SP and SN, or may be a pulse wave that maintains the levels of the symbols SP and SN during an arbitrary time. The above-described content may be identically applied to the following description. For another example, the negative symbol SN may correspond to a value of logic 0 and may be a symbol with second amplitude AL. In some implementations, the first amplitude AH and the second amplitude AL have opposite signs to each other. The magnitude of the absolute value of the first amplitude AH may be the same as the magnitude of the absolute value of the second amplitude AL.

Figure 2B:
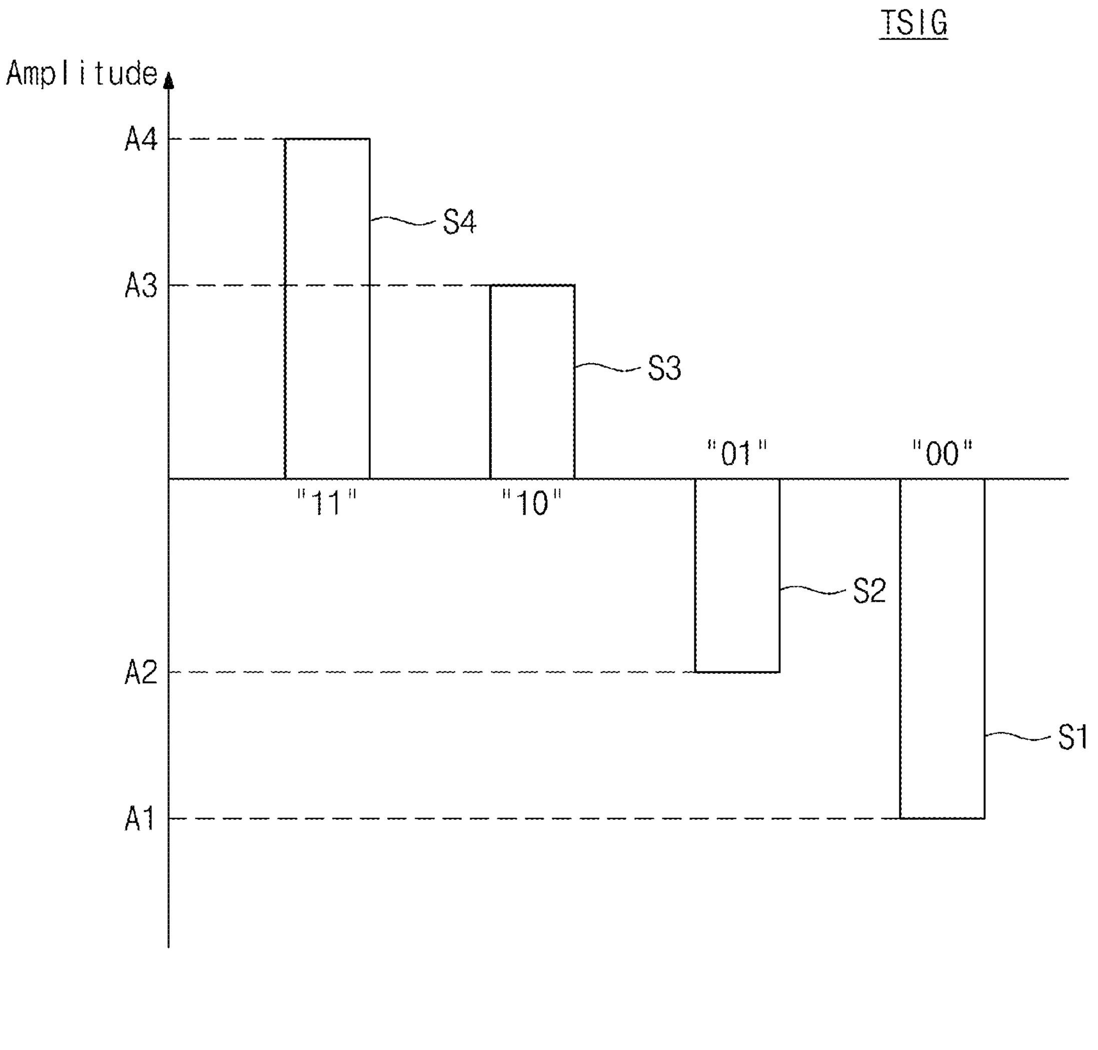

FIG. 2B shows another example of symbols included in the transmission signal TSIG. The transmission signal TSIG may be the transmission signal TSIG1 or TSIG2 of FIG. 1, or may be similar to the transmission signal TSIG1 or TSIG2 of FIG. 1. In some implementations, the transmission signal TSIG may include four symbols. In some implementations, the transmission signal TSIG of FIG. 2B may include symbols obtained by encoding data in a pulse amplitude modulation-4 (PAM-4) scheme.

For example, referring to FIG. 2B, a first symbol S1 may correspond to logic '00', and may be a symbol (e.g., impulse with first amplitude A1) with the first amplitude A1. A second symbol S2 may correspond to logic '01' and may be a symbol (e.g., impulse with second amplitude A2) with the second amplitude A2. In some implementations, the magnitude of the first amplitude A1 may be greater than the magnitude of the second amplitude A2. For example, the magnitude of the first amplitude A1 may be twice the magnitude of the second amplitude A2.

For another example, a third symbol S3 may correspond to logic '10', and may be a symbol (e.g., impulse with third amplitude A3) with the third amplitude A3. A fourth symbol S4 may correspond to logic '11' and may be a symbol (e.g., impulse with fourth amplitude A4) with the fourth amplitude A4. In some implementations, the magnitude of the fourth amplitude A4 may be greater than the magnitude of the third amplitude A3. For example, the magnitude of the fourth amplitude A4 may be twice the magnitude of the third amplitude A3. Logical values corresponding to the symbols S1 to S4 are examples, and the scope of the present disclosure is not limited thereto. For example, the mapping between the symbols S1 to S4 and data may be performed in an arbitrary scheme.

In some implementations, the magnitude of the first amplitude A1 may be the same as the magnitude of the fourth amplitude A4, and the sign of the first amplitude A1 may be opposite to the sign of the fourth amplitude A4. In some implementations, the magnitude of the second amplitude A2 may be the same as the magnitude of the third amplitude A3, and the sign of the second amplitude A2 may be opposite to the sign of the third amplitude A3. Hereinafter, it will be described that the transmission signal TSIG includes symbols described according to the coding scheme of FIG. 2B. However, the scope of the present disclosure is not limited thereto.

Figure 2C:
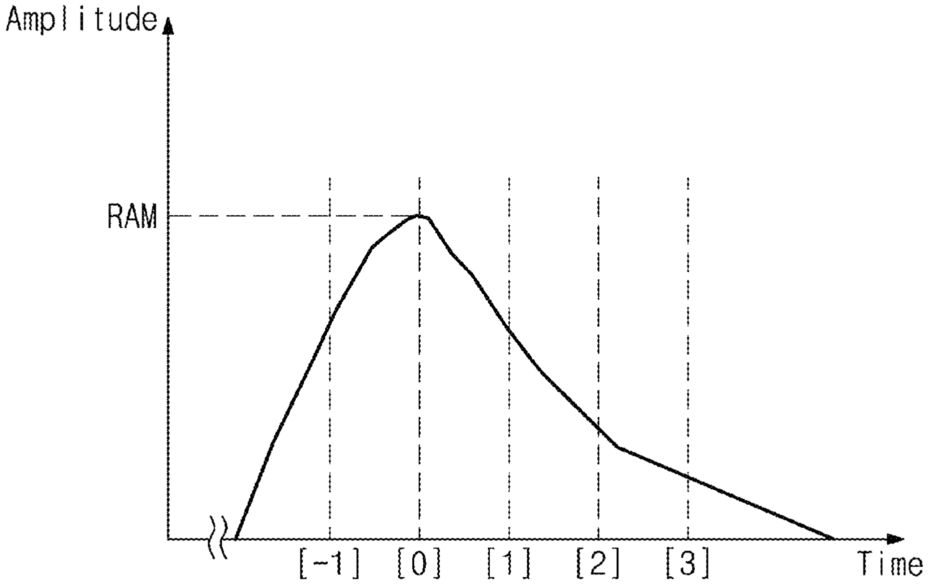

FIG. 2C shows an example of a single bit response (SBR) of the received signal RSIG. The received signal RSIG may be the received signals RSIG1 and RSIG2 of FIG. 1, or may be similar to the received signals RSIG1 and RSIG2. Referring to FIG. 2C, a horizontal axis indicates time and a vertical axis indicates amplitude. In FIG. 2C, the time axis may be an axis associated with discrete time. The received signal RSIG illustrated in FIG. 2C may be a signal generated as the transmission signal TSIG including the first symbol S1 of FIG. 2B passes through the channels 1300 and 1350 of FIG. 1.

The received signal RSIG may be determined or generated based on the characteristics of the channels 1300 and 1350 and the transmission signal TSIG. In some implementations, the received signal RSIG may be expressed as the result of a convolution operation between transfer functions of channels 1300 and 1350 and the transmission signal TSIG. For example, a function of the received signal RSIG with time may be expressed as Equation 1.

$$R[n] = T[n] * H[n] = H[0]T[n] + \sum_{k=-\infty, k\neq 0}^{\infty} H[k]T[n-k] \quad \text{[Equation 1]}$$

In Equation 1, T[n] denotes a function of the transmission signal TSIG with time; H[n] denotes a transfer function of a channel; and R[n] denotes a function of the received signal RSIG with time. As shown in Equation 1, the received signal RSIG may be expressed through a convolution operation between the transfer function of the channel and the transmission signal TSIG. Although Equation 1 is expressed as a function of a digital time domain. However, the scope of the present disclosure is not limited thereto. For example, it should be understood that the use of a continuous time domain is also within the scope of the present disclosure.

In some implementations, unlike symbols included in the transmission signal TSIG, the received signal RSIG may include a sidelobe. Referring to Equation 1, the received signal R[n] may have signals at other cursors (or other time points) as well as the main cursor signal [0](H[0]T[n] in Equation 1). For example, the received signal RSIG may have a maximum amplitude RAM at the main cursor [0] and may have a signal level (or amplitude) between 0 and the maximum amplitude RAM at each of a cursor [−1], a cursor [1], and a cursor ([2]). In some implementations, the maximum amplitude RAM of the received signal RSIG is smaller than the amplitude of a symbol of the transmission signal TSIG on which the received signal RSIG is based.

The reason is that noise is introduced or signal loss occurs within a channel as the length of the channel increases (e.g., a long reach channel) or the signal transmission speed (e.g., a frequency) increases. Because the transfer function of a channel is not ideal, the symbol of the received signal RSIG does not have the same shape as the symbol of the transmission signal TSIG.

Figure 2D:
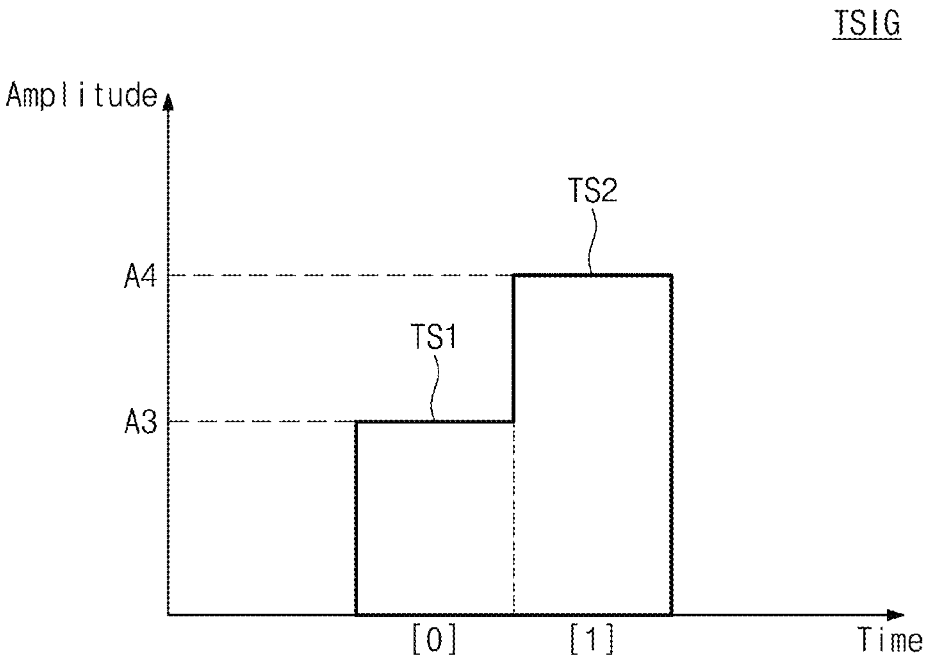
Figure 2E:
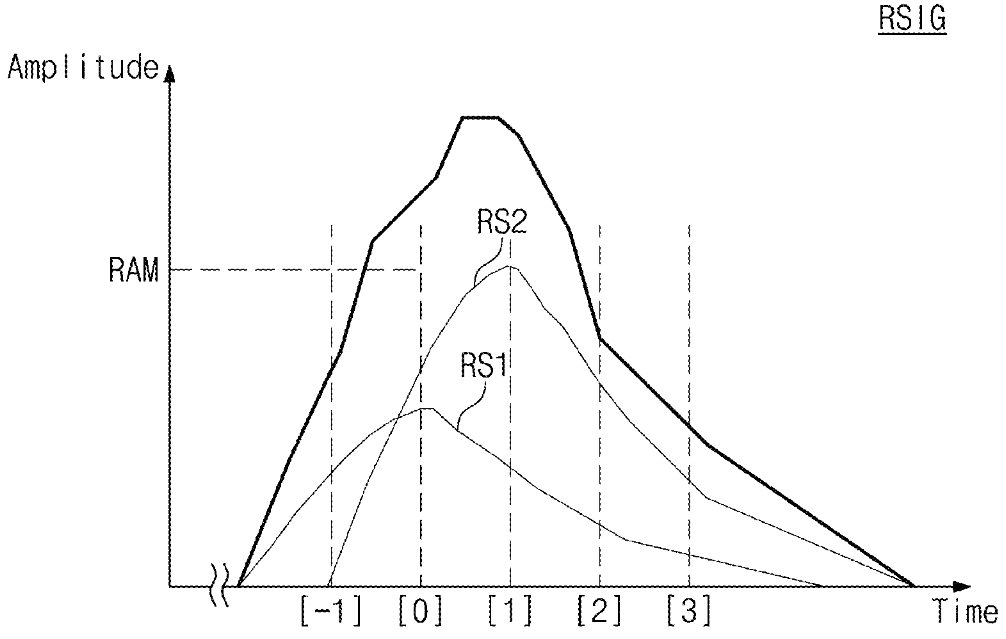

FIGS. 2D and 2E show the transmission signal TSIG, the received signal RSIG, and adjacent ISI sequentially including a plurality of symbols. Referring to FIGS. 2D and 2E, a horizontal axis of each graph indicates time, and a vertical axis of each graph indicates amplitude. In FIG. 2D, an example of the transmission signal TSIG is shown. For example, the transmission signal TSIG in FIG. 2D may be a signal that includes symbols generated in the coding scheme described with reference to FIG. 2B. The main cursor [0] of FIG. 2D and the main cursor [0] of FIG. 2E may be different time points from each other. Likewise, the first cursor [1] of FIG. 2D and the first cursor [1] of FIG. 2E may be different time points from each other.

Referring to FIG. 2D, the transmission signal TSIG may include two symbols. The first symbol TS1 transmitted at the 0-th cursor [0] may be a symbol having the third amplitude A3, and the second symbol TS2 transmitted at the first cursor [1] may be a symbol having the fourth amplitude A4. Referring to FIG. 2E, the first symbol TS1 may pass through channels and then may change into a first reception symbol RS1. The first reception symbol RS1 may have the maximum amplitude at the 0-th cursor [0]. Likewise, the second symbol TS2 may pass through the channels and then may change into a second reception symbol RS2. The second reception symbol RS2 may have the maximum amplitude at the first cursor [1]. The first reception symbol RS1 and the second reception symbol RS2 may be generated as described with reference to FIG. 2C. As the amplitude of the second symbol TS2 is greater than the amplitude of the first symbol TS1, the maximum value of the amplitude of the second reception symbol RS2 may be greater than the maximum value of the amplitude of the first reception symbol RS1.

The received signal RSIG may be generated by combining the first reception symbol RS1 and the second reception symbol RS2. In some implementations, the received signal RSIG may be generated by combining pieces of amplitude (or portions of waveforms) of the first reception symbol RS1 and the second reception symbol RS2 at the same cursor (or a time point). For example, referring to FIG. 2E, the received signal RSIG may be displayed in a form of a solid line. As such, a signal may be distorted due to the reception result of an adjacent symbol. This phenomenon is called ISI.

As the ISI increases, an eye is closed on an eye diagram of the received signal RSIG. In this case, a noise margin for detecting data of the received signal RSIG is reduced, and a time margin for a time point, at which a value of the received signal RSIG is detected, is also reduced. Accordingly, it may be difficult to detect the symbol or data indicated by the received signal RSIG. To solve the issues, a receiver may include an equalizer. Accordingly, the eye of the eye diagram of the received signal RSIG may be opened by improving a signal-to-noise ratio (SNR) based on the equalizing operation of the equalizer, or removing the ISI. When the noise or ISI of the received signal RSIG is severe, the receiver may detect data included in the received signal RSIG by setting (data or error) threshold values after the eye is open. However, even when the noise or ISI of the received signal RSIG is severe, the receiver capable of quickly and accurately detecting data of the received signal RSIG by quickly and accurately setting at least one or more (data or error) threshold values is required.

FIG. 3 is a block diagram showing an example of a receiver, e.g., the receiver of FIG. 1, according to some implementations of the present disclosure. Referring to FIG. 3, the receiver 100 may include a pre-processing block 110, an equalization block 120, a threshold generation block 130, a clock generation block 140, and a data slicer block 150. It is described that the receiver 100 is included in the electronic device 1100 of FIG. 1. However, it should be understood that the receiver 200 included in the second electronic device 1200 may also be the same as or similar to the receiver 100.

The pre-processing block 110 may receive a received signal from a channel. For example, the pre-processing block 110 may receive the received signal RSIG generated as the transmission signal TSIG transmitted from the second electronic device 1200 of FIG. 1 passes through the channel 1350. In some implementations, the pre-processing block 110 may perform an amplification operation (e.g., analog amplification) of signals of a frequency in a specific band. For example, the pre-processing block 110 may perform analog amplification on a frequency band including symbols. The pre-processing block 110 may restore some of the signal, which is lost due to the passage of the channel 1350, based on the amplification operation. As a detailed example, the pre-processing block 110 may include a continuous time linear equalizer (CTLE) capable of amplifying a frequency domain including data of the received signal RSIG.

The pre-processing block 110 may perform a pre-processing operation on the received signal RSIG. In some implementations, the pre-processing block 110 performs a digitization operation of the received signal RSIG. For example, the pre-processing block 110 may generate a pre-processing signal PPS by digitizing the received signal RSIG. In some implementations, the pre-processing block 110 may operate in response to a clock signal CS of the clock generation block 140. For example, the pre-processing block 110 may perform a digitization operation (e.g., a sampling operation) by using the clock signal CS and may generate the pre-processing signal PPS. The detailed structure and operation of the pre-processing block 110 will be described in more detail with reference to FIG. 14.

The equalization block 120 may generate an equalization signal ES by performing an equalizing operation on the pre-processing signal PPS. The equalization block 120 may deliver the generated equalization signal ES to the threshold generation block 130, the clock generation block 140, or the data slicer block 150. In some implementations, the equalization block 120 generates the equalization signal ES by improving the SNR of the pre-processing signal PPS, or restoring a signal distorted by ISI.

The equalization block 120 may include an analog-based equalizer, a digital-based equalizer, or any combination thereof that performs equalizing operations according to various schemes. In some implementations, the equalization block 120 includes a digital signal process (DSP)-based equalizer. For example, the equalization block 120 may include an equalizer such as a feed-forward equalizer (FFE) or a decision feedback equalizer (DFE).

The equalization block 120 may generate a coefficient required for the operation of the equalizer included in the equalization block 120. In some implementations, the equalization block 120 generates or optimizes coefficients used for the operation of the equalizer included in the equalization block 120, based on various algorithms. For example, the equalization block 120 may generate or optimize the coefficients used in the operation of the equalizer (e.g., FFE or DFE) based on the error threshold ET (or error threshold values included in the error threshold ET) received from the threshold generation block 130, and a sign-sign least mean square (SS-LMS) algorithm.

In some implementations, one or more equalizers included in the equalization block 120 perform an equalizer adaptation operation based on the error threshold ET. For example, the equalization block 120 may perform the equalizer adaptation operation by generating or optimizing the coefficient of the equalizer based on the error threshold ET and an equalizer coefficient generation algorithm. In some implementations, an equalizer, on which the equalizer adaptation operation is performed, generates the equalization signal ES obtained by removing ISI from the pre-processing signal PPS or improving SNR.

In some implementations, the equalization signal ES may be the same as or similar to the pre-processing signal PPS. For example, when the equalization block 120 receives the pre-processing signal PPS before completing the equalizer adaptation operation, the equalization signal ES may be the same as or similar to the pre-processing signal PPS. In some implementations, when the equalization block 120 receives the pre-processing signal PPS before receiving the error threshold ET (e.g., newly generated) from the threshold generation block 130, the equalization block 120 may generate the equalization signal ES from the pre-processing signal PPS based on the error threshold ET previously received from the threshold generation block 130 (e.g., new equalizing operation).

The equalization block 120 may restore a distorted signal (e.g., due to ISI) such that data included in the transmission signal TSIG is capable of being determined. In some implementations, the equalization block 120 may restore the distorted signal based on the error threshold ET received from the threshold generation block 130. For example, the equalization block 120 may remove the distorted part of the pre-processing signal PPS based on pieces of amplitude (or portions of waveforms) of symbols indicated by the error threshold, and may allow the transmission signal TSIG to be restored.

The threshold generation block 130 may generate various thresholds required for the operation of the receiver 100. In some implementations, the threshold generation block 130 generates the error threshold ET and the data threshold DT. The error threshold ET may include at least one or more error threshold values. Likewise, the data threshold DT may include at least one or more data threshold values.

Each of the error threshold values included in the error threshold ET may be used to restore symbols included in the transmission signal TSIG. Each of the data threshold values included in the data threshold DT may be used to identify or determine the data included in the symbol by identifying the symbols of the restored signal. Examples of the number and type of error threshold values or data threshold values respectively included by the error threshold ET and the data threshold DT are described in more detail with reference to FIG. 7. In some implementations, the error threshold values or the data threshold values may correspond to voltage levels or current levels. For example, the error threshold values may correspond to the voltage level of a pulse.

The threshold generation block 130 may generate the error threshold ET and the data threshold DT based on a signal generated from the equalization signal ES (e.g., the filter signal FS in FIG. 4). In some implementations, the threshold generation block 130 may include a filter circuit that processes the equalization signal ES, and may generate the error threshold ET and the data threshold DT based on the signal generated by the operation of the filter circuit. The signal generated by the operation of the filter circuit will be described in more detail with reference to FIGS. 4 to 13.

The threshold generation block 130 may deliver the generated thresholds to elements of the receiver 100. For example, the threshold generation block 130 may deliver the generated error threshold ET to the equalization block 120, and/or the clock generation block 140, and may deliver the data threshold DT to the data slicer block 150. In some implementations, even when the noise of the received signal RSIG is severe, the ISI is severe, or the eye on the eye diagram of the received signal RSIG is closed, the threshold generation block 130 may generate the error threshold ET and the data threshold DT. Examples of the detailed structure and operation of the threshold generation block 130 will be described with reference to FIGS. 4 to 13.

The clock generation block 140 may generate a clock signal required for the operation of the pre-processing block 110. In some implementations, the clock generation block 140 may generate or adjust the clock signal CS based on the equalization signal ES and the error threshold ET. For example, the clock generation block 140 may adjust the timing of a rising edge or a falling edge of the clock signal CS based on the equalization signal ES and the error threshold ET. The detailed structure and operation of the clock generation block 140 will be described with reference to FIG. 15.

The data slicer block 150 may determine data based on the equalization signal ES. In some implementations, the data slicer block 150 may determine data based on the amplitude of the symbol included in the equalization signal ES. In some implementations, the data slicer block 150 may determine data based on the data threshold DT received from the threshold generation block 130. For example, the data slicer block 150 may determine the data included in the equalization signal ES based on at least one or more data threshold values included in the data threshold DT. In some implementations, the data slicer block 150 may deliver the determined data to a physical coding sub-layer, and parallelized or decoded data may be delivered to the functional module 1110 or the buffer module 1120 of FIG. 1.

In some implementations, some or all of the receiver 100 may perform digital signal processing. For example, the equalization block 120, the threshold generation block 130, or the data slicer block 150 may perform the digital signal processing. In some implementations, each of the blocks 110 to 150 of the receiver 100 may be partially or fully implemented as a digital circuit.

FIG. 4 is a block diagram showing a threshold generation block, e.g., the threshold generation block of FIG. 3, according to some implementations of the present disclosure. Referring to FIG. 4, a threshold generation block 300 may include a filter circuit 310 and a threshold calculation circuit 320. Through the configuration of FIG. 4 and associated/similar configurations, even when there is loss of the received signal RSIG, the ISI is severe, or the eye on an eye diagram of the received signal RSIG is closed, the threshold generation block 300 can generate the error threshold ET to be provided to the equalization block 120 of FIG. 3 and the data threshold DT to be provided to the data slicer block 150 in FIG. 3. The threshold generation block 300 may correspond to the threshold generation block 130 of FIG. 3, and may be the same as or similar to the threshold generation block 130 of FIG. 3.

The filter circuit 310 may receive the equalization signal ES and may generate the filter signal FS by performing a filtering operation. The filter circuit 310 may provide the generated filter signal FS to the threshold calculation circuit 320.

In some implementations, the filter signal FS may include a first symbol of a first time point (or cursor) and a second symbol of a second time point (or cursor) before the first time point (or cursor), and the first symbol and the second symbol may have a negative covariance relation. For example, the filter signal FS may include the first symbol of the first time point and the second symbol of the second time point immediately before the first time point, and the first symbol and the second symbol may have a negative covariance relation. In some implementations, the filter signal FS may include a plurality of symbols respectively corresponding to a plurality of time points. At least part of the plurality of symbols may have a negative covariance relation with the symbol of each previous (or immediately preceding) time point or cursor. In some implementations, the filter signal FS may have first amplitude at the first time point, and may have second amplitude at the second time point before (or immediately before) the first time point. The first amplitude and the second amplitude may have a negative covariance relation. In some implementations, the filter signal FS may have pieces of amplitude (or portions of waveforms) respectively corresponding to a plurality of time points. At least part of the pieces of amplitude (or portions of waveforms) may have a negative covariance relation with the amplitude of each previous (or immediately preceding) time point (or cursor).

In some implementations, the filter signal FS may have little ISI effect by the channels 1300 and 1350. For example, a clock pattern signal may be an example of a signal with the characteristics of the filter signal FS. The clock pattern signal has very little ISI effect when passing through a communication channel. The extent to which the ISI of each of the equalization signal ES and the filter signal FS occurs will be described with reference to FIG. 5C. In some implementations, as the filter signal FS is generated based on the equalization signal ES generated as the transmission signal TSIG passes through the channel 1350, the filter signal FS includes both the characteristics of the channel 1350 and the transmission signal TSIG.

The filter circuit 310 may deliver the filter signal FS to the threshold calculation circuit 320. The filter circuit 310 may generate the filter signal FS based on various schemes (e.g., a partial response signaling (PRS) scheme). A specific example by which the filter circuit 310 generates the filter signal FS will be described with reference to FIGS. 5A and 5B.

The threshold calculation circuit 320 may generate a plurality of thresholds based on the filter signal FS. In some implementations, the threshold calculation circuit 320 generates the error threshold ET and the data threshold DT based on the filter signal FS. For example, the threshold calculation circuit 320 may generate the error threshold ET including at least one or more error threshold values based on the filter signal FS. As another example, the threshold calculation circuit 320 may generate the data threshold DT including at least one or more data threshold values based on the filter signal FS.

In some implementations, the threshold calculation circuit 320 delivers the generated thresholds to element(s) of the receiver 100 in FIG. 3. For example, the threshold calculation circuit 320 may deliver the data threshold DT to the data slicer block 150 of FIG. 3. As another example, the threshold calculation circuit 320 may deliver the error threshold ET to the equalization block 120 or the clock generation block 140 of FIG. 3.

The threshold calculation circuit 320 may generate a threshold based on various algorithms. In some implementations, the threshold calculation circuit 320 generates the error threshold ET and the data threshold DT based on the result of applying an algorithm to the filter signal FS. For example, the threshold calculation circuit 320 may generate the error threshold ET and the data threshold DT based on obtaining the absolute average of the filter signal FS. An example of the threshold generation operation of the threshold calculation circuit 320 will be described in more detail with reference to FIGS. 6A and 6B, and the error threshold ET and the data threshold DT will be described in more detail with reference to FIG. 7.

Figure 5A:
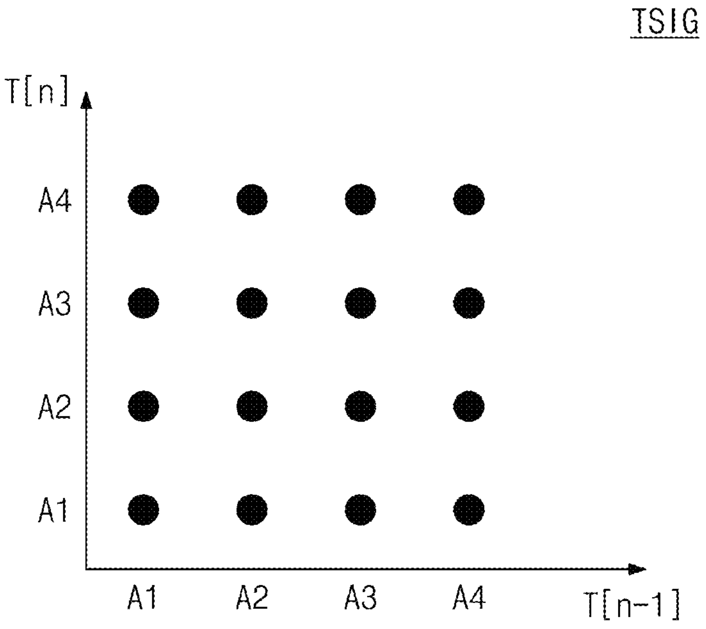
FIG. 5A is a scatter plot showing a current symbol of a transmission signal and a symbol at an immediately-preceding time point, according to some implementations of the present disclosure.
Figure 5B:
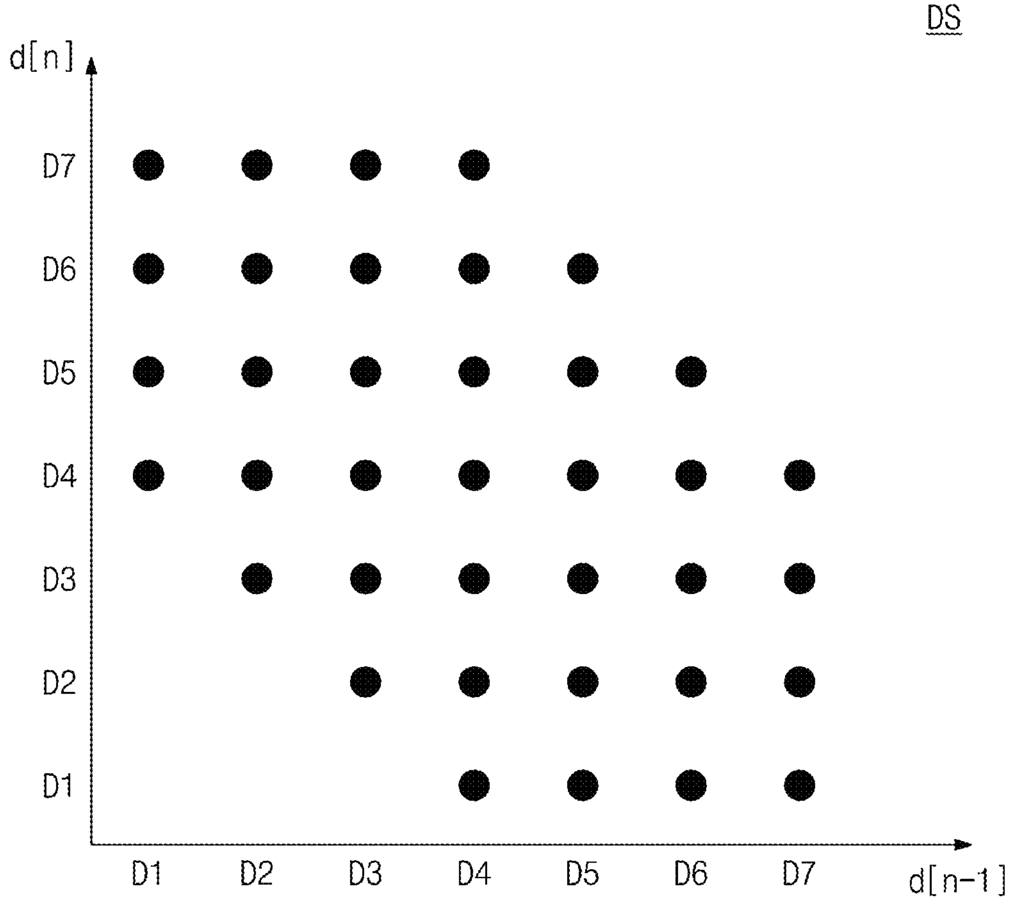
FIG. 5B is a scatter plot showing a current symbol of a difference signal and a symbol at an immediately-preceding time point, according to some implementations of the present disclosure.

FIGS. 5A and 5B are scatter plots showing an example of generating the filter signal FS of the filter circuit 310 of FIG. 4, according to some implementations of the present disclosure. FIG. 5A is a scatter plot showing a current transmission symbol T[n] of the transmission signal TSIG and an immediately-preceding transmission symbol T[n−1] at an immediately-preceding time point of the current transmission symbol T[n]. FIG. 5B is a scatter plot showing a current difference symbol d[n] of a difference signal DS and an immediately-preceding difference symbol d[n−1] at the immediately-preceding time point of the current difference symbol d[n]. Referring to FIGS. 5A and 5B, a horizontal axis indicates the amplitude of an immediately-preceding symbol, and a vertical axis indicates the amplitude of a current symbol.

Referring to FIG. 5A, symbols which the immediately-preceding transmission symbol T[n−1] and the current transmission symbol T[n] may have in the transmission signals TSIG in FIG. 1, are shown. For example, the immediately-preceding transmission symbol T[n−1]may be a signal before one cursor (or unit time interval) of the current transmission symbol T[n].

The transmission signal TSIG of FIG. 5A may include symbols encoded in the same scheme as the scheme described in FIG. 2B. In some implementations, similarly to in FIG. 2B, the fourth amplitude A4 and the first amplitude A1 may have the same magnitude as each other and opposite signs to each other, and the third amplitude A3 and the second amplitude A2 may have the same magnitude as each other and opposite signs to each other. In some implementations, the magnitude of the fourth amplitude A4 may be greater than the magnitude of the third amplitude A3. As shown in FIG. 5A, negative covariance may not appear between symbols of the current transmission symbol T[n] and symbols of the immediately-preceding transmission symbol T[n−1] included in the transmission signal TSIG.

Referring to FIG. 4, in some implementations, the filter circuit 310 may generate the filter signal FS based on a 1-dimensional partial response signal (1-D PRS) scheme. For example, the filter circuit 310 may generate the filter signal FS according to Equation 2.

$$FS[n] = ES[n] - ES[n-1] \qquad \text{[Equation 2]}$$

In Equation 2, FS[n] is a function of a filter signal with time, and ES[n] is a function of the equalization signal ES of FIGS. 3 and 4 with time. ES[n−1] is a function of a delay signal obtained by delaying the equalization signal ES of FIGS. 3 and 4 by one cursor (or unit time interval) with time. Equation 2 may indicate an equation that implements the 1-D PRS scheme. Although Equation 2 is expressed as a function of a digital time domain, the scope of the present disclosure is not limited thereto. For example, it should be understood the use of functions in a continuous time domain is also within the scope of the present disclosure.

In FIG. 5B, the difference signal DS generated based on the transmission signal TSIG of FIGS. 1 and 5A is described. The function of the difference signal DS with time may be expressed as Equation 3.

$$DS[n] = T[n] - T[n-1] \qquad \text{[Equation 3]}$$

In Equation 3, DS[n] denotes the function for the time of the difference signal DS. T[n] denotes a function for the time of the transmission signal TSIG. T[n−1] is a function for the time of the signal obtained by delaying the transmission signal TSIG by one cursor (or unit time).

Referring to FIG. 5B, symbols of each of the current difference symbol d[n] and the immediately-preceding difference symbol d[n−1] are shown, respectively. The current difference symbol d[n] and the immediately-preceding difference symbol d[n−1] are a symbol of an arbitrary time point of the difference signal DS, which is described based on Equation 3, and a symbol immediately before the arbitrary time point, respectively. In some implementations, at least part of symbols of the difference signal DS have a negative covariance relation with the symbol at the immediately-preceding time point. For example, referring to FIG. 5B, in the difference signal DS, as the amplitude of the immediately-preceding difference symbol d[n−1] increases, the amplitude of the current difference symbol d[n] may have a decreasing trend, and the current difference symbol d[n] and the immediately-preceding difference symbol d[n−1] may have a negative covariance relation with each other.

In FIG. 5B, seven pieces of difference amplitude D1 to D7 are shown, corresponding to various combinations of subtraction of the amplitudes A1 to A4. The pieces of difference amplitude D1 to D7 may be pieces of amplitude of the symbols of the difference signal DS. The pieces of difference amplitude D1 to D7 may be generated based on a difference in amplitude between the current transmission symbol T[n] in FIG. 5A and the immediately-preceding transmission signal T[n−1] in FIG. 5A. For example, when the amplitude of the current transmission signal is the fourth amplitude A4, and the amplitude of the immediately-preceding transmission signal is the first amplitude A1, the seventh difference amplitude D7 may be generated. Likewise, when the amplitude of the current transmission signal is the same as the amplitude of the immediately-preceding transmission signal, the fourth difference amplitude D4 may be generated. Besides, pieces of difference amplitude, which exclude D4 and D7, from among the pieces of difference amplitude D1 to D7 may also be generated depending on a difference between the pieces of amplitude A1 to A4 of symbols of the transmission signal TSIG.

Referring to FIG. 1, in some implementations, the filter signal FS may be the same as or similar to a signal obtained as the difference signal DS passes through the channel 1350. For example, the filter signal FS may be the same as or similar to a signal pre-processed by the pre-processing block 110 after the difference signal DS passes through the channel 1350. The relationship between the filter signal FS and the difference signal DS will be described based on Equation 4.

$$y[n] = \ldots + H[-2]T[n+2] + H[-1]T[n+1] + H[0]T[n] + H[1]T[n-1] + \ldots \quad \text{[Equation 4]}$$

$$y[n-1] = \ldots + H[-2]T[n+1] + H[-1]T[n] + H[0]T[n-1] + H[1]T[n-2] + \ldots$$

$$y[n] - y[n-1] = d[n] = \sum_{k=-\infty}^{\infty} H[k]DS[n-k] = H[n] * DS[n]$$

In Equation 4, y[n] denotes a function of the received signal RSIG with time; T[n] denotes a function of the transmission signal TSIG with time; and H[n] denotes a transfer function of a channel. d[n] denotes a function of a reception difference signal generated based on the received signal RSIG and a delay signal, which is obtained by delaying the received signal RSIG by one cursor (or unit time), with time. Referring to Equation 4, a part of a convolution operation between a function of the transmission signal TSIG expressing y[n] and y[n−1] with time and the transfer function of the channel is expressed. The reception difference signal d[n] may be determined by subtracting y[n−1] from y[n]. The result may be the same as the convolution between the function of the difference signal DS with time and the transfer function of the channel. In other words, the reception difference signal d[n] is generated based on the received signal RSIG. However, the reception difference signal d[n] may be the same as a signal obtained as the difference signal DS in FIG. 5B passes through the channel.

The equalization signal ES may be generated by performing a pre-processing operation or equalizing operation on the received signal RSIG. In some implementations, the filter signal FS may be the same or similar to a signal generated by performing a pre-processing operation or equalizing operation on the reception difference signal d[n]. In some implementations, the filter signal FS may be generated from the reception difference signal d[n] in a scheme the same as a scheme in which the equalization signal ES is generated from the received signal RSIG. For example, (as expressed through Equation 2), the filter signal FS may be generated by applying the 1-D PRS scheme to the equalization signal ES. In some implementations, the equalization signal ES, which is the basis of the filter signal FS, may be a signal before the equalization block 120 performs an equalizing operation on the pre-processing signal PPS based on the error threshold ET.

The difference signal DS may be less affected by ISI generated by passing through the channel. For example, like the difference signal DS, a signal in which symbols at an arbitrary time point within the signal have a negative covariance relation with a symbol at the immediately-preceding time point may be a clock signal. Even when the clock signal passes through the channel, very little ISI occurs. Likewise, even when the difference signal DS passes through the channel, as at least some of the symbols have a negative covariance relation with symbols at the immediately-preceding time point, little (e.g., very) ISI may occur. For example, the reception difference signal d[n] and the filter signal FS, which are generated as the difference signal DS passes through the channel 1300, may be signals with less ISI. A comparison of occurrence of the ISI between the filter signal FS and the equalization signal ES will be described in more detail with reference to FIG. 5C.

Figure 5C:
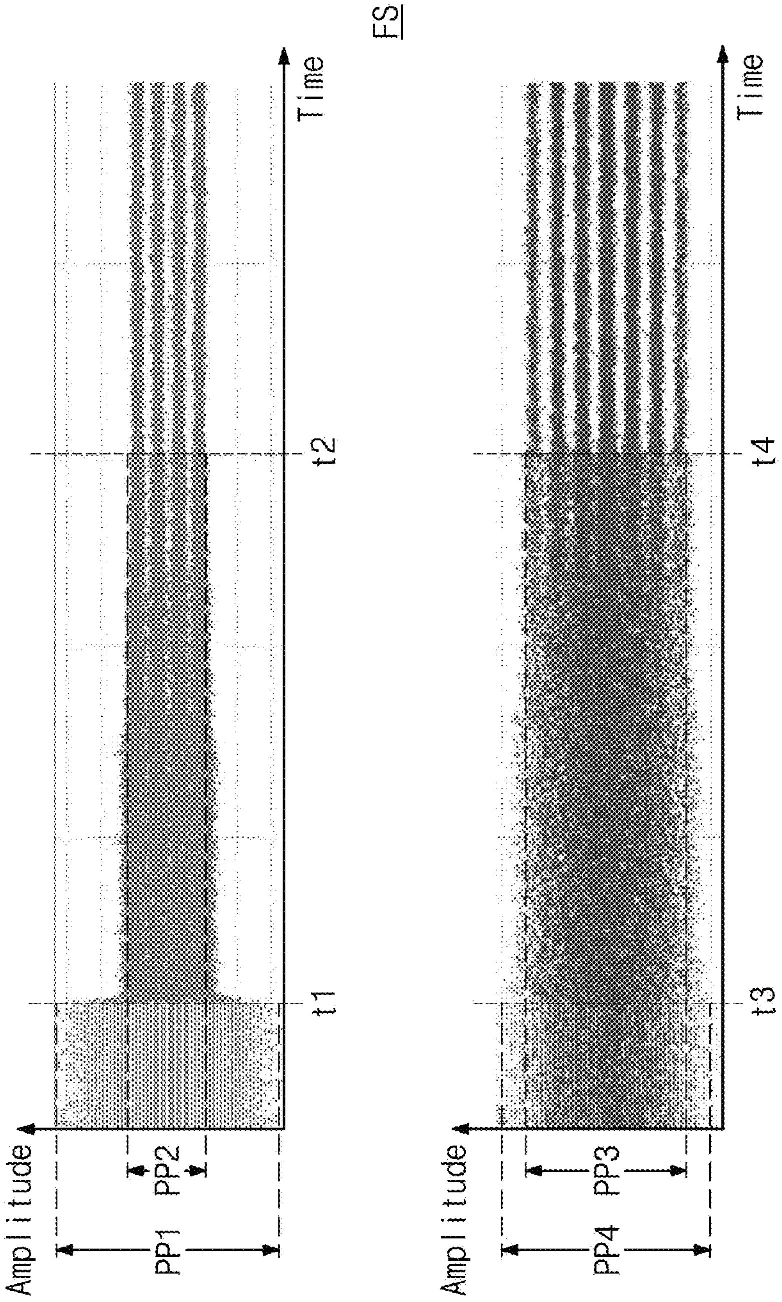
FIG. 5C is a graph showing an equalization signal and a filter signal, according to some implementations of the present disclosure.

FIG. 5C is a graph showing a change in amplitude of the equalization signal ES by an equalizer adaptation operation, and a change in amplitude of the filter signal FS in the equalizer adaptation operation of FIGS. 4 to 5B. In FIG. 5C, it illustrated that the generated filter signal FS has less ISI. However, the scope of the present disclosure is not be limited to such results. Referring to FIG. 5C, changes over time in the equalization signal ES and the filter signal FS are shown. In FIG. 5C, a vertical axis of each graph indicates amplitude, and a horizontal axis of each graph indicates time.

In some implementations, as described with reference to 5B, the filter signal FS may be the same or similar to a signal generated by performing a pre-processing or equalizing operation on the reception difference signal d[n]. For example, the filter signal FS may be the same or similar to a signal generated as the difference signal DS of FIG. 5B passes through a channel and the pre-processing operation or the equalizing operation is performed. Likewise, the equalization signal ES may be the same or similar to a signal generated by performing the pre-processing or equalizing operation on the received signal RSIG.

In FIG. 5C, it may be seen that a peak-to-peak value of the equalization signal ES decreases after a first time point t1. For example, the peak-to-peak value of the equalization signal ES before the first time point t1 may be a first value PP1; the peak-to-peak value at a second time point t2 after the first time point t1 may be a second value PP2; and, the second value PP2 may be smaller than the first value PP1. In some implementations, a time interval between the first time point t1 and the second time point t2 is an equalizer adaptation time, e.g., a time for setting optimal equalizer coefficients. For example, a decrease in a peak-to-peak value according to the equalizing operation of the equalization signal ES may mean that the influence of the ISI is removed from the equalization signal ES based on the equalizing operation. Accordingly, it may be seen that the equalization signal ES swings with amplitude greater than the amplitude of original symbols due to the ISI based on channel passage before the equalizing operation is performed (e.g., by the equalization block 120 in FIG. 3).

Like the equalization signal ES, the equalizing operation may be performed on the filter signal FS so as to match the number and levels of symbols included in the filter signal FS after a third time point t3. In some implementations, there may be no difference in the peak-to-peak value of the filter signal FS before and after the equalizing operation, or it may be (e.g., very) small. For example, a difference between a third value PP3, which is the peak-to-peak value of the filter signal FS at a third time point t3, and a fourth value PP4, which is the peak-to-peak value of the filter signal FS at a fourth time point t4, may be very small. As the difference in the peak-to-peak value before and after the equalizing operation is small, the filter signal FS may be determined to have little ISI.

Accordingly, regardless of the degree of the ISI of the equalization signal ES, the receiver 100 in FIG. 1 and the threshold generation block 130 in FIG. 3, which use the filter signal FS, may generate the error threshold ET and the data threshold DT based on the filter signal FS. According to some implementations of the present disclosure, the receiver 100 generating the error threshold ET and the data threshold DT based on the filter signal FS may generate a threshold (e.g., the error threshold ET) more accurately (e.g., faster) than at the first time point t1 without preceding the equalizer adaptation process even in an environment with severe distortion due to ISI such as LR channel (long reach). Some implementations in which the receiver 100 generates the error threshold ET and the data threshold DT will be described in detail with reference to FIGS. 6A, 6B, and 7.

FIGS. 6A and 6B are tables showing a process in which a threshold calculation circuit, e.g., the threshold calculation circuit 320 of FIG. 4, calculates the error threshold ET and the data threshold DT. FIG. 6A is a table showing a process of calculating an absolute average of the transmission signal TSIG, e.g., TSIG of FIG. 5A. FIG. 6B is a table showing a process of calculating an absolute average of the difference signal DS, e.g., DS of FIG. 5B.

For convenience of description, arbitrary, non-limiting values are assumed for the magnitude or level of the amplitude in FIGS. 6A and 6B. Referring to FIG. 6A, the fourth amplitude A4 may have a magnitude of 3, and the first amplitude A1, which has the same magnitude and opposite sign, may have a magnitude of −3. Likewise, the third amplitude A3 may have a magnitude of 1, and the second amplitude A2 may have a magnitude of −1.

Referring to FIG. 6A, the probability of each of the symbols of the transmission signal TSIG is shown. The transmission signal TSIG may be a random signal. In the generation of the transmission signal TSIG, as each of the symbols may be generated randomly, the probability of each of the symbols may be the same, ¼. Next, absolute values of pieces of amplitude are shown. The absolute value of amplitude of a symbol with the fourth amplitude A4 may be 3, and the absolute value of amplitude of a symbol with the second amplitude A2 may be 1. When the absolute average is obtained based on the product of the probability of symbols and the absolute value of amplitude, the absolute average of symbols of the transmission signal TSIG is 2 (¾+¼+¾+¼=2).

Referring to FIG. 6B, the probability of each of symbols of the difference signal DS is shown. As illustrated in FIG. 6A, probabilities of the symbols of the transmission signal TSIG are the same as each other. However, as the amplitude of a difference signal is capable of being generated based on an arbitrary combination, the probabilities of the symbols of the difference signal DS may be different from each other. For example, as the magnitude of the seventh difference amplitude D7 is 6, and the number of generated cases is 1, the probability may be 1/16 (¼*¼=1/16). Likewise, as the magnitude of the fourth difference amplitude D4 is 0, and the number of generated cases is 4, the probability may be 4/16 (4*¼*¼=4/16). In FIG. 6B, the probability of each of the difference symbols may be calculated in the same method as above. The product of the absolute amplitude and each of the probabilities is as shown in FIG. 6B, and the sum thereof is 2.5.

Referring to FIGS. 6A and 6B together, the absolute average between the transmission signal TSIG and the difference signal DS may have a constant ratio. For example, the absolute average of the transmission signal TSIG may be 0.8 (2.0/2.5) times the absolute average of the difference signal DS. In some implementations, a ratio between the absolute average of the transmission signal TSIG and the error threshold values within the error threshold ET is constant. In some implementations, a ratio between the absolute average of the transmission signal TSIG and the data threshold values within the data threshold DT is constant. For example, error threshold values for restoring the transmission signal TSIG may be obtained based on the absolute average of the difference signal DS and the above-mentioned ratios. Data threshold values for data extraction of the restored transmission signal TSIG may be obtained accordingly.

Referring further to FIGS. 3 to 5C, even when the difference signal DS passes through a channel, the influence of ISI may be small. The filter signal FS, which is generated by performing a pre-processing operation or equalizing operation after the difference signal DS passes through the channel, may be less affected by the ISI. Accordingly, a difference in a peak-to-peak value between the filter signal FS and the difference signal DS may be small. The absolute average of the filter signal FS may be the same as or similar to the absolute average of the difference signal DS. Accordingly, the absolute average of the filter signal FS may be used to calculate the error threshold ET needed to restore the transmission signal TSIG from the equalization signal ES. In some implementations, the ratio between the absolute average of the filter signal FS and the absolute average of the transmission signal TSIG is the same as (or similar to) the ratio between the absolute average of the difference signal DS and the absolute average of the transmission signal TSIG. Some implementations of generating error threshold values of the error threshold ET and data threshold values of the data threshold DT based on an absolute average of the filter signal FS will be described in detail with reference to FIG. 7.

Figure 7:
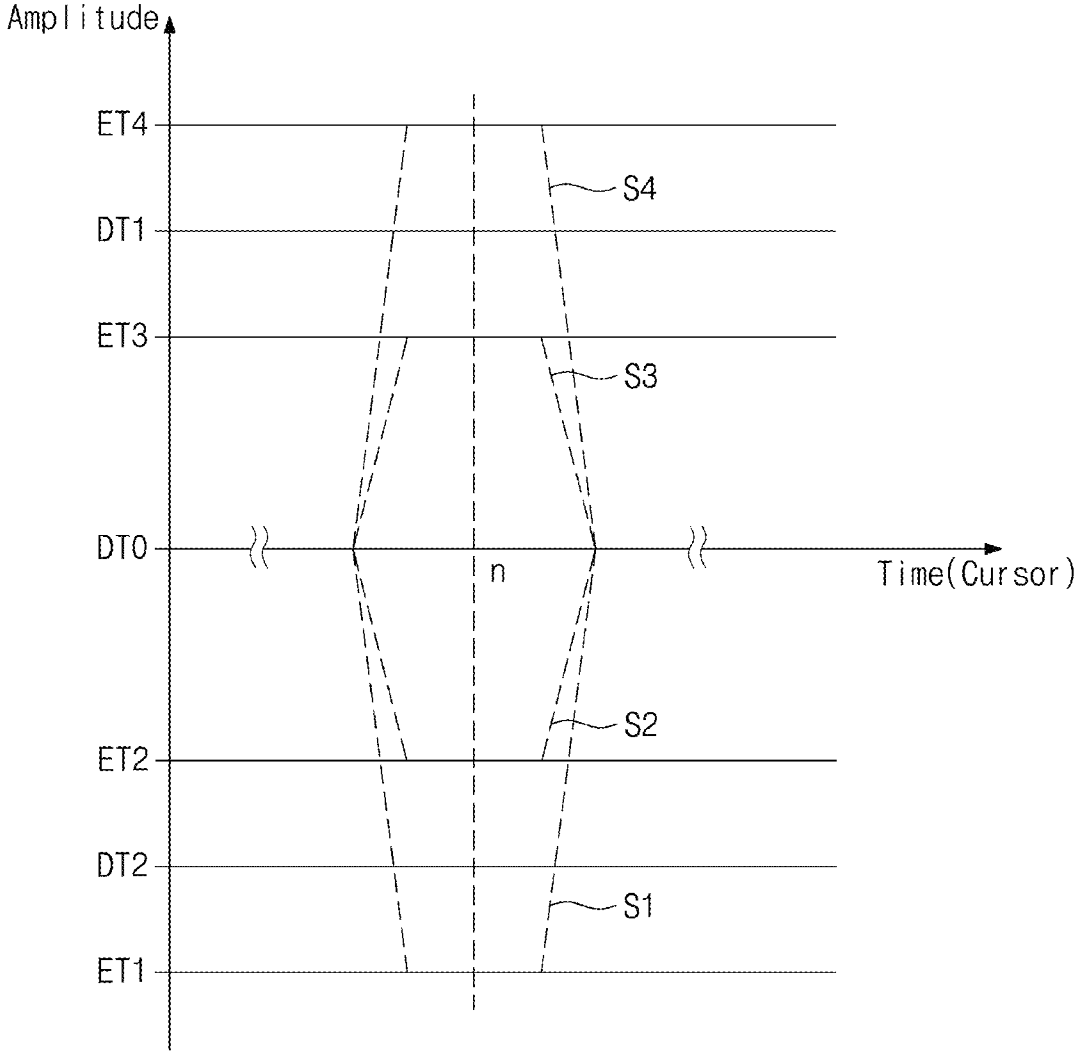
FIG. 7 is a graph showing an example of a process in which a threshold calculation circuit calculates error threshold values included in an error threshold and data threshold values included in a data threshold.

FIG. 7 is a graph showing a process in which a threshold calculation circuit (e.g., the threshold calculation circuit of FIG. 4) calculates error threshold values included in an error threshold and data threshold values included in a data threshold, according to some implementations of the present disclosure. Referring to FIG. 7, a horizontal axis indicates time (or cursor), and a vertical axis indicates amplitude. An operation in which the threshold calculation circuit 320 of FIG. 4 calculates error threshold values or data threshold values will be described with reference to FIGS. 4, 6A, 6B, and 7.

The threshold calculation circuit 320 may calculate threshold values ET1 to ET4, DT1, and DT2 based on a ratio between the transmission signal TSIG and the threshold values ET1 to ET4, DT1, and DT2. In some implementations, the first data threshold value DT1 is equal to the absolute average of the transmission signal TSIG. For example, referring to FIG. 6A, the absolute average of the transmission signal TSIG may be 2, which may be a threshold value for distinguishing between the fourth symbol S4 and the third symbol S3. The threshold calculation circuit 320 may obtain the absolute average of the filter signal FS and may obtain the first data threshold value DT1 by calculating the absolute average of the transmission signal TSIG based on the absolute average. For example, a ratio of the absolute average between the absolute average of the filter signal FS and the transmission signal TSIG may be a first ratio.

The second data threshold value DT2 has the same absolute value as the first data threshold value DT1, and the sign of the second data threshold value DT2 may be opposite to the sign of the first data threshold value DT1. In some implementations, the threshold calculation circuit 320 calculates the second data threshold value DT2 based on the first data threshold value DT1. In some implementations, like a bias voltage level, the 0-th data threshold value DT0 for distinguishing between the second symbol S2 and the third symbol S3 is a point where the level of the signal is 0. For example, the 0-th data threshold value DT0 may be equal to a common mode level of the received signal RSIG or the equalization signal ES.

In some implementations, the threshold calculation circuit 320 obtains the error threshold values ET1 to ET4 of the error threshold ET based on the absolute average of the filter signal FS. The error threshold values ET1 to ET4 may be threshold values used to restore symbols of the transmission signal TSIG. Ratios between the absolute average of the filter signal FS and the error threshold values ET1 to ET4 may be second ratios. In some implementations, the second ratios may be equal to (or similar to) the ratios between the absolute average of the difference signal DS and error threshold values.

The fourth error threshold value ET4 may be a threshold value used to restore the fourth symbol S4. Similarly, other threshold values, which exclude the fourth error threshold value ET4, from among the threshold values ET1 to ET4 may be threshold values used to restore the corresponding symbols S1 to S3, respectively. For example, referring to the example in FIG. 6A, each of the second error threshold value ET2 and the third error threshold value ET3 may be 0.5 times the average of the transmission signal TSIG. The threshold calculation circuit 320 may obtain the second error threshold value ET2 and the third error threshold value ET3 by multiplying the absolute average of the filter signal FS by 0.4 (0.8*0.5=0.4). For example, the third error threshold value ET3 may be generated by multiplying the absolute average of the filter signal FS by 0.4. The second error threshold value ET2, which has only the opposite sign, may be generated by multiplying the absolute average of the filter signal FS by −0.4.

Likewise, the first error threshold value ET1 and the fourth error threshold value ET4 may be 1.5 times the absolute average of the transmission signal TSIG, and may be 1.2 times the absolute average of the filter signal FS (1.5*0.8=1.2). For example, the threshold calculation circuit 320 may obtain the fourth error threshold value ET4 by multiplying the absolute average of the filter signal FS by 1.2 times and may obtain the first error threshold value ET1 by multiplying the absolute average of the filter signal FS by −1.2.

The foregoing description of obtaining the error threshold values ET1 to ET4 of the error threshold ET described with reference to FIG. 7, and of obtaining the data threshold values DT1 and DT2 of the data threshold DT, are examples, and the scope of the present disclosure is not limited thereto. For example, implementations in which the threshold calculation circuit 320 obtains the threshold values ET1 to ET4, DT1, and DT2 by multiplying the absolute average of the filter signal FS by values other than the above-mentioned values should also be understood as falling within the scope of the present disclosure. Further, it is described that the absolute values of some of the threshold values described with reference to FIG. 7 are the same as each other, and the signs thereof are opposite to each other. However, the scope of the present disclosure is not limited thereto. For example, in at least part of the threshold values ET1 to ET4, DT1, and DT2, there may not be a pair having the same absolute value of a threshold value.

Likewise, in FIG. 7, the transmission signal TSIG includes symbols according to the coding scheme of FIG. 2B, but the scope of the present disclosure is not limited thereto. In some implementations, the threshold calculation circuit 320 calculates threshold values used for signal restoration or data extraction based on the same or similar operation for signals to which a coding scheme such as PAM-8 or PAM-N is applied.

Referring again to FIG. 4, in some implementations, the threshold calculation circuit 320 obtains the absolute average of the filter signal FS received from the filter circuit 310 when the transmission signal TSIG includes symbols encoded in PAM-N. In some implementations, an absolute average AA of the filter signal FS calculated by the threshold calculation circuit 320 is the same as (or similar to) the absolute average of the difference signal DS. For example, the result obtained as the threshold calculation circuit 320 calculates the absolute average AA of the filter signal FS may be expressed as Equation 5.

$$AA = \frac{4\sum_{i=0}^{N-2}\{(N-1-i)(i+1)\}}{N^2} \quad \text{[Equation 5]}$$

In Equation 5, 'N' is the number of symbols capable of being included in the transmission signal TSIG. For example, 'N' may be a natural number capable of being expressed as a power of 2. As the absolute average of the transmission signal TSIG is N/2, error threshold values and data threshold values may be generated based on the first ratio between the absolute average of the transmission signal TSIG and the absolute average of the filter signal FS, the second ratios between the absolute average of the transmission signal TSIG and threshold values of the error threshold ET, and the third ratios between threshold values of the data threshold DT. For example, the threshold generation block 130 may generate error threshold values included in the error threshold ET and data threshold values included in the data threshold DT by applying the first ratio, the second ratios, and the third ratios to the absolute average AA of the filter signal FS. (The absolute average of the received signal RSIG generated based on the first ratio may be one of the data threshold values, and the first ratio may be included in the third ratios.)

As a detailed example, when the receiver 100 of FIG. 3 receives the received signal RSIG generated based on the transmission signal TSIG including symbols encoded in PAM-8, and a level of each of symbols of the transmission signal TSIGs is 7, ±5, ±3, ±1, an example of calculating threshold values is as follows. In the example above, the absolute average of the filter signal FS may be calculated based on Equation 5 and may be 5.25. Moreover, in the above case, error threshold values may be ±7, ±5, ±3, ±1, and data threshold values may be ±6, ±4, ±2, 0. In other words, to obtain the error threshold values, the second ratios multiplied by the absolute average of the filter signal FS to which the 1-D PRS scheme is applied may be ±7/5.25, ±5/5.25, ±3/5.25, ±1/5.25. Likewise, to obtain the data threshold values, the third ratios multiplied by the absolute average of the filter signal FS to which the 1-D PRS scheme is applied may be ±6/5.25, ±4/5.25, 2/5.25. The threshold calculation circuit 320 of FIG. 4 may calculate the absolute average AA of the filter signal FS generated by the filter circuit 310 of FIG. 4, may calculate error threshold values by multiplying the absolute average AA by the second ratios ±7/5.25, ±5/5.25, 3/5.25, ±1/5.25, and may calculate data threshold values by multiplying the absolute average AA by the third ratios ±6/5.25, ±4/5.25, ±2/5.25. The numbers specified in the above examples are for convenience of description. The scope of the present disclosure is not limited thereto. In some implementations, to facilitate the threshold calculation circuit 320 in FIG. 4 to obtain the error threshold values and the data threshold values depending on a scheme of generating symbols, a coding scheme of data, the magnitude of amplitude, or a ratio in amplitude between symbols, the ratios multiplied by the absolute average of the filter signal FS may be different from each other.

Even when signal loss is severe due to ISI or noise, the receiver 100 described with reference to FIGS. 3 to 7 may quickly and accurately find the threshold values necessary for restoring the transmission signal TSIG. Furthermore, the receiver 100 may quickly and accurately calculate the error threshold values and the data threshold values by generating and using a signal similar to a received signal generated when a transmitted signal (e.g., a clock pattern signal), in which adjacent symbols have a negative covariance relation with each other, passes through a channel. For example, unlike a receiver that necessarily removes some of the ISI of the received signal RSIG or opens the eye on the eye diagram and only then finds the threshold values, the receiver 100 according to some implementations of the present disclosure may quickly and accurately find the error threshold values and the data threshold values required for restoration of the transmission signal TSIG even when the ISI of the received signal RSIG is severe or the eye on the eye diagram is closed. For example, the receiver 100 according to some implementations of the present disclosure may obtain the error threshold values and the data threshold values necessary for restoring the transmission signal TSIG regardless of signal distortion due to noise or ISI.

For example, the receiver 100 described with reference to FIGS. 3 to 7 may quickly and accurately find threshold values for restoration of the received signal even in an environment such as a long-reach (LR) channel where signal loss or distortion is severe. For example, the receiver 100 of FIGS. 3 to 7 may remove some or all of dependencies between symbols based on a filter operation before completing an equalizer adaptation operation, and may quickly and accurately calculate the error threshold values of the error threshold ET and the data threshold values of the data threshold DT based on removing some or all of the dependencies even in situations where ISI occurs, noise is severe, or signal loss is severe.

Figure 8:
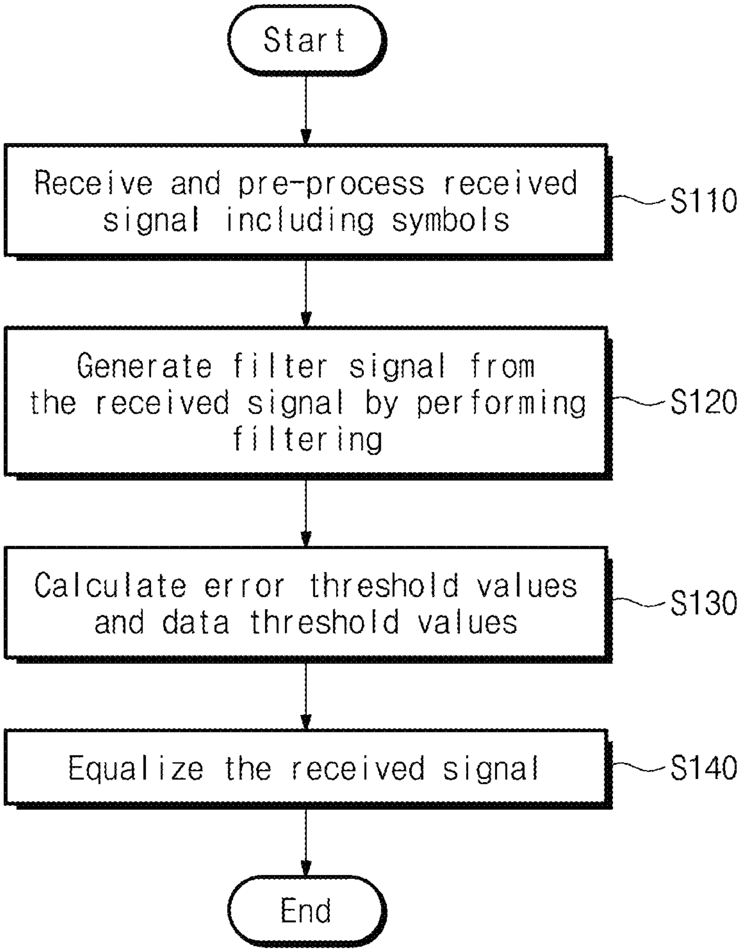
FIG. 8 is a flowchart showing an example of an operating method of a receiver.

FIG. 8 is a flowchart showing an operating method of a receiver, e.g., the receiver of FIGS. 3 to 7, according to some implementations of the present disclosure.

In operation S110, the receiver 100 receives and pre-processes a signal including symbols. In some implementations, the received signal RSIG received by the receiver 100 is generated based on the transmission signal TSIG including a plurality of symbols. For example, the receiver 100 may receive the received signal RSIG generated as the transmission signal TSIG including symbols encoded in the scheme of FIG. 2B passes through the channel 1300 of FIG. 1. In some implementations, the receiver 100 performs a pre-processing operation based on digitization of the received signal RSIG. For example, the receiver 100 may digitize the received signal RSIG in response to the clock signal CS through the pre-processing block 110 of FIG. 4 and may generate the pre-processing signal PPS.

In operation S120, the receiver 100 generates the filter signal FS of FIGS. 4 to 7. The receiver 100 may generate the filter signal FS by performing a filtering operation. In some implementations, the receiver 100 may generate the filter signal FS through the filter circuit 310 in the threshold generation block 300. In some implementations, the receiver 100 may generate the filter signal FS based on various schemes. For example, the receiver 100 may generate the filter signal FS by applying a 1-PRS scheme to the equalization signal ES through the filter circuit 310.

In operation S130, the receiver 100 calculates error threshold values and data threshold values from the generated filter signal FS. In some implementations, the receiver 100 calculates the error threshold values and the data threshold values based on the absolute average of the filter signal FS. For example, the receiver 100 may calculate the absolute average of the filter signal FS according to the scheme described in FIGS. 4 and 6B and may calculate the error threshold values and the data threshold values as described with reference to FIG. 7 based on the absolute average of the filter signal FS. In some implementations, the receiver 100 calculates the absolute average of the filter signal FS through the threshold calculation circuit 320 included in the threshold generation block 300, and thereby obtain the error threshold values and the data threshold values.

In operation S140, the receiver 100 performs an equalizing operation on the received signal RSIG. In some implementations, the receiver 100 performs the equalizing operation on the received signal RSIG by performing an equalizing operation on the pre-processing signal PPS. In some implementations, the receiver 100 performs the equalizing operation based on the error threshold values obtained in operation S130. For example, the receiver 100 may perform an equalizing operation of the received signal RSIG through the equalization block 120. The equalization block 120 may perform the equalizing operation by using the error threshold values (e.g., ET1 to ET4 in FIG. 7) in the error threshold ET received from the threshold generation block 130.

The equalization block 120 of the receiver 100 may generate the equalization signal ES by performing an equalizing operation on the pre-processing signal PPS based on the error threshold values ET1 to ET4. For example, the equalization block 120 may perform the equalizing operation by changing coefficients of an equalizer (e.g., DFE or FFE) included in the equalization block 120 based on the received error threshold values ET1 to ET4. In this case, in the equalization signal ES, distortion of a signal due to ISI may be reduced to the extent that data is capable of being determined based on the data threshold values DT0, DT1, and DT2. Accordingly, the equalization signal ES may be restored to an extent to which the equalization signal ES is the same as or similar to the transmission signal TSIG.

After operation S140, the receiver 100 may extract data from the equalization signal ES. In some implementations, the receiver 100 extracts data through the data slicer block 150. In some implementations, the receiver 100 determines symbols or extracts data, by using data threshold values. For example, the data slicer block 150 of the receiver 100 may detect symbols (or pieces of amplitude at each sampling time point) in the equalization signal ES by using the data threshold values DT0, DT1, and DT2 included in the data threshold DT received from the threshold generation block 130, and may determine the data included in the symbols. The data determined by the data slicer block 150 may be delivered to a serializer connected to the receiver 100, or may be delivered to the functional module 1110 or the buffer module 1120 of FIG. 1.

Figure 9:
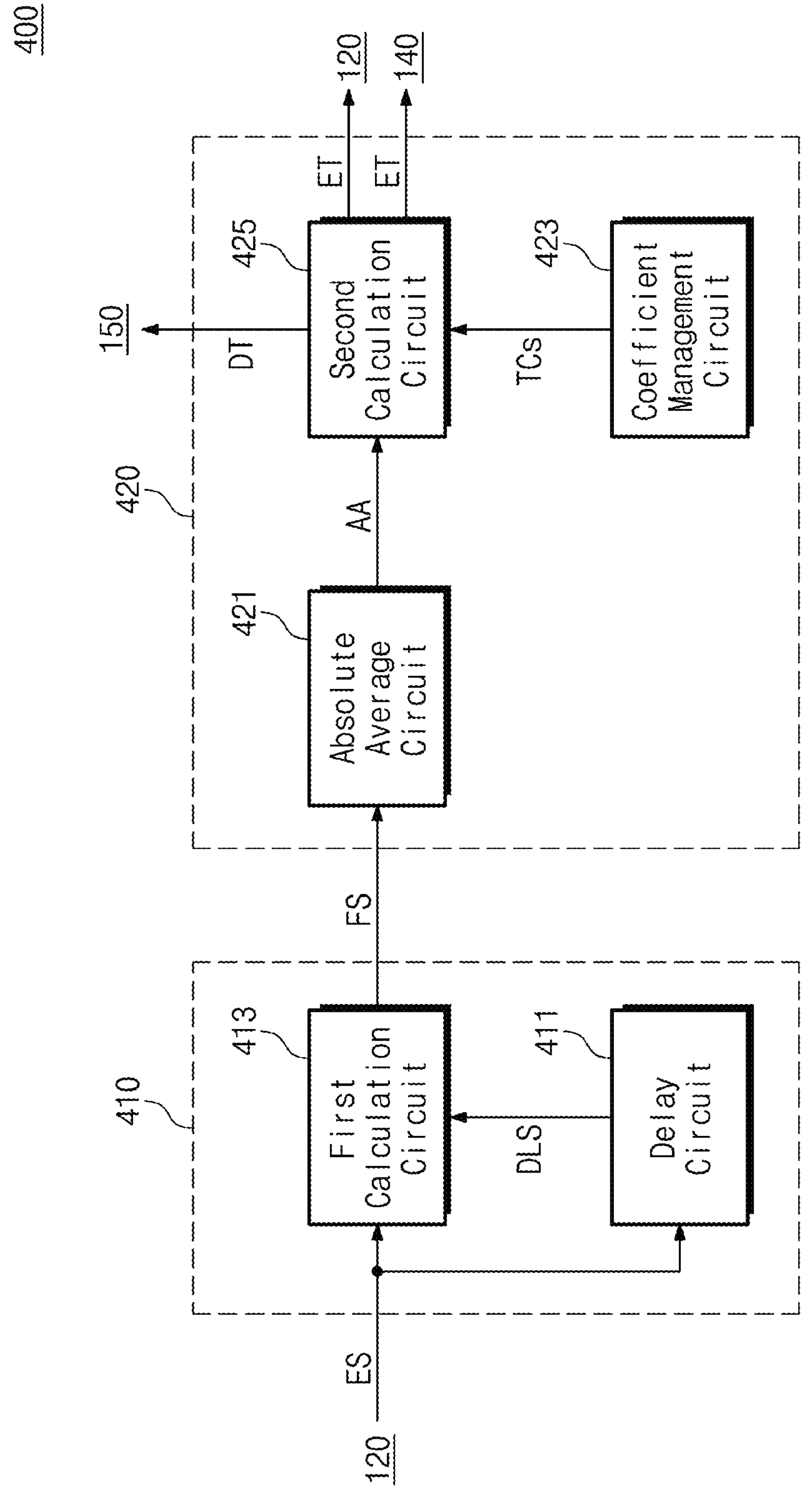
FIG. 9 is a block diagram showing an example of a threshold generation block.

FIG. 9 is a block diagram showing an example of a threshold generation block, e.g., the threshold generation block of FIG. 4, according to some implementations of the present disclosure. Referring to FIG. 9, a threshold generation block 400 may include a delay circuit 411, a first calculation circuit 413, an absolute average circuit 421, a coefficient management circuit 423, and a second calculation circuit 425. An example of implementing a threshold generation block according to some implementations of the present disclosure will be described with reference to FIG. 9.

The delay circuit 411 may generate a delay signal DLS of the equalization signal ES. In some implementations, the delay circuit 411 may generate the delay signal DLS that is delayed by an arbitrary amount of time from an input signal. For example, the delay circuit 411 may generate the delay signal DLS, which is obtained by delaying the equalization signal ES by one cursor (or an unit time interval, for example, $z^{-1}$). The delay circuit 411 may deliver the generated delay signal DLS to the first calculation circuit 413.

The first calculation circuit 413 may generate the filter signal FS. In some implementations, the first calculation circuit 413 may generate the filter signal FS based on the equalization signal ES and the delay signal DLS. For example, the first calculation circuit 413 may generate the filter signal FS by subtracting the delay signal DLS from the equalization signal ES. The first calculation circuit 413 may deliver the generated filter signal FS to the absolute average circuit 421 within a threshold calculation circuit 420.

The delay circuit 411 and the first calculation circuit 413 may be included in a filter circuit 410. The filter circuit 410 may correspond to the filter circuit 310 of FIG. 4. In some implementations, the delay circuit 411 and the first calculation circuit 413 generate the filter signal FS having partially or completely negative covariance between adjacent symbols, by applying a 1-D PRS scheme to the received equalization signal ES.

The absolute average circuit 421 calculates an absolute average of the received signal. The absolute average circuit 421 may generate the absolute average of the received signal in a manner identical or similar to the method described through FIGS. 6A and 6B. The absolute average may be obtained by performing an operation of calculating the average of values that take the absolute values of the levels of the signal. In some implementations, the absolute average circuit 421 may generate the absolute average of the filter signal FS. For example, the absolute average circuit 421 may generate the absolute average AA of the filter signal FS, and may deliver the generated absolute average AA to the second calculation circuit 425.

The coefficient management circuit 423 may generate or manage threshold coefficients TCs used to generate error threshold values within the error threshold ET and data threshold values within the data threshold DT. In some implementations, the threshold coefficients TCs includes or stores first ratios multiplied by the absolute average AA to calculate the error threshold values, or second ratios multiplied by the absolute average AA to calculate the data threshold values. The coefficient management circuit 423 may deliver the threshold coefficients TCs to the second calculation circuit 425.

In some implementations, the coefficient management circuit 423 receives the threshold coefficients TCs used for generating the error threshold values or the data threshold values from the functional module 1110 of FIG. 1 or the buffer module 1120 of FIG. 1. In some implementations, the coefficient management circuit 423 generates or manages the threshold coefficients TCs that are different depending on a coding scheme of symbols included in the transmission signal TSIG and the magnitude of amplitude of each of the symbols. In some implementations, the coefficient management circuit 423 generates or manages coefficient groups including coefficients that are different depending on the coding schemes of symbols of the transmission signal TSIG. For example, the coefficient management circuit 423 may include first coefficient groups corresponding to a case where the transmission signal TSIG includes symbols encoded in a NRZ scheme, second coefficient groups corresponding to a case where the transmission signal TSIG includes symbols encoded in a PAM-4 scheme, or coefficient groups corresponding to each case where the transmission signal includes symbols encoded in an arbitrary scheme.

The second calculation circuit 425 may obtain threshold values based on the absolute average AA and the threshold coefficients TCs. In some implementations, the second calculation circuit 425 may generate threshold values by multiplying the absolute average AA and each of the threshold coefficients TCs. For example, the second calculation circuit 425 may calculate the error threshold values included in the error threshold ET by multiplying the absolute average AA and each of the coefficients, which are related to the error threshold values, from among the threshold coefficients TCs. Likewise, the second calculation circuit 425 may calculate the data threshold values included in the data threshold DT by multiplying the absolute average AA and each of the coefficients, which are related to the data threshold values, from among the threshold coefficients TCs.

The second calculation circuit 425 may deliver the generated error threshold ET to the equalization block 120 of FIG. 3 and the clock generation block 140 of FIG. 3. The second calculation circuit 425 may deliver the generated data threshold DT to the data slicer block 150. The absolute average circuit 421, the coefficient management circuit 423, and the second calculation circuit 425 may be included in the threshold calculation circuit 420, and the threshold calculation circuit 420 may correspond to the threshold calculation circuit 320 of FIG. 4.

The division of the delay circuit 411, the first calculation circuit 413, the absolute average circuit 421, the coefficient management circuit 423, and the second calculation circuit 425, which are described with reference to FIG. 9, is a functional division, and the scope of the present disclosure is not limited thereto. For example, implementations in which the second calculation circuit 425 and the coefficient management circuit 423 are implemented as one circuit, should also be understood as falling within the scope of the present disclosure. In some implementations, all of the components of FIG. 9 are implemented as one integrated circuit. In some implementations, one or more of the components of FIG. 9 are implemented on different integrated circuits or chips from each other. In some implementations, the delay circuit 411, the first calculation circuit 413, the absolute average circuit 421, the coefficient management circuit 423, and the second calculation circuit 425 are implemented with an FPGA or ASIC.

Figure 10:
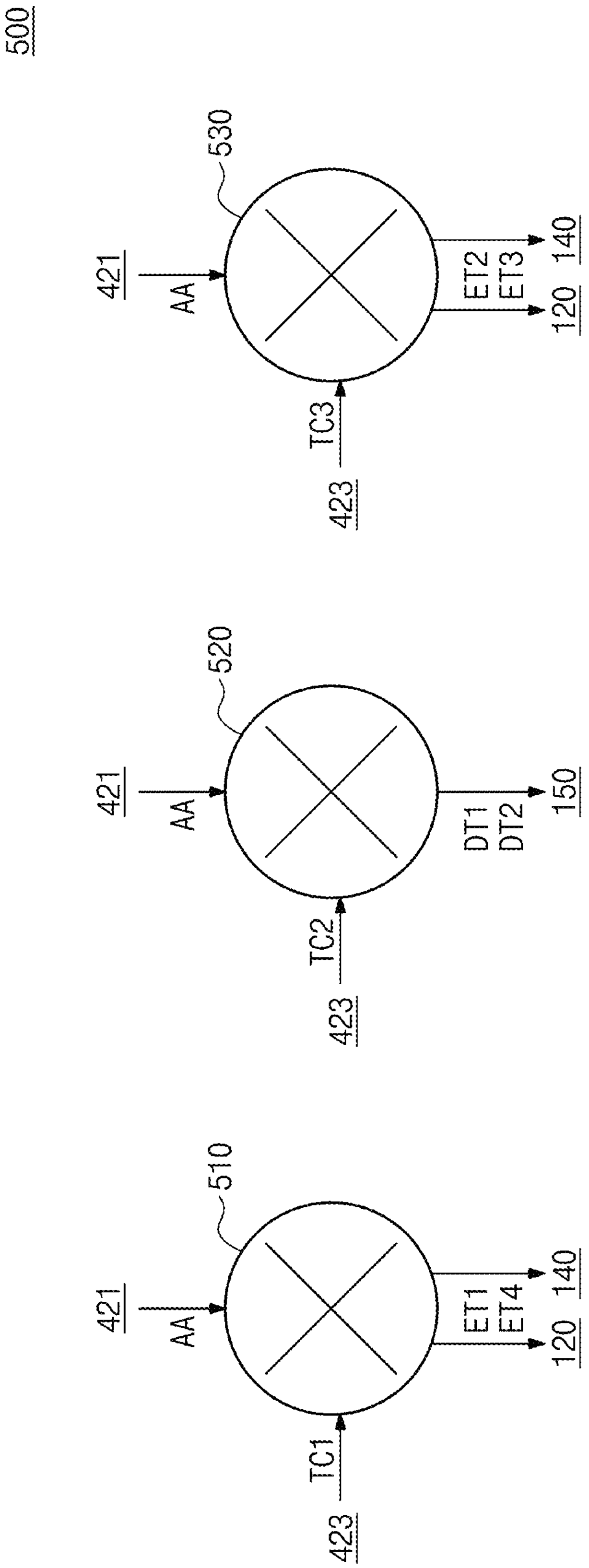
FIG. 10 is a diagram showing an example of the second calculation circuit of FIG. 9.

FIG. 10 is a circuit diagram showing an example of the second calculation circuit of FIG. 9, according to some implementations of the present disclosure. Referring to FIG. 10, a second calculation circuit 500 may include a first multiplier 510, a second multiplier 520, and a third multiplier 530. FIG. 10 is described based on the examples of FIGS. 6B and 7, but the present disclosure should not be understood as limited thereto.

Each of the first multiplier 510, the second multiplier 520, and the third multiplier 530 may perform multiplication between an absolute average and threshold coefficients. In some implementations, the first multiplier 510, the second multiplier 520, and the third multiplier 530 may multiply inputs, and may output the result of multiplying inputs and the result, which has the same absolute value as the result of multiplying the inputs and has an opposite sign to that of the result of multiplying the inputs, as output values. The inputs and the output of the first multiplier 510, the second multiplier 520, and the third multiplier 530 described below are examples. Modifications and combinations thereof should also be understood to fall within the scope of the present disclosure.

Referring to FIGS. 9 and 10 together, the first multiplier 510 may receive the absolute average AA from the absolute average circuit 421 and a first threshold coefficient TC1 from the coefficient management circuit 423 as the inputs. The first multiplier 510 may multiply the absolute average AA and the first threshold coefficient TC1 and may generate the first error threshold value ET1 and the fourth error threshold value ET4 of FIG. 7 based on the multiplication result. The first multiplier 510 may provide the generated first error threshold value ET1 and the generated fourth error threshold value ET4 to the equalization block 120 and the clock generation block 140 of FIG. 3.

Likewise, the second multiplier 520 may receive the absolute average AA from the absolute average circuit 421 and a second threshold coefficient TC2 from the coefficient management circuit 423 as the inputs. The second multiplier 520 may multiply the absolute average AA and the second threshold coefficient TC2 and may generate the first data threshold value DT1 and the second data threshold value DT2 of FIG. 7 based on the multiplication result. The second multiplier 520 may deliver the generated first data threshold value DT1 and the second data threshold value DT2 to the data slicer block 150 in FIG. 3.

The third multiplier 530 may have the absolute average AA received from the absolute average circuit 421 and a third threshold coefficient TC3 received from the coefficient management circuit 423 as the inputs. The third multiplier 530 may multiply the absolute average AA and the third threshold coefficient TC3 and may generate the second error threshold value ET2 and the third error threshold value ET3 of FIG. 7 based on the multiplication result. The third multiplier 530 may provide the generated second error threshold value ET2 and the generated third error threshold value ET3 to the equalization block 120 and the clock generation block 140 of FIG. 3.

The first multiplier 510, the second multiplier 520, and the third multiplier 530 shown and described in FIG. 10 are classified according to functions, operations, or operating unit. The scope of the present disclosure is not limited to the foregoing classification/division. In some implementations, at least some or all of the first multiplier 510, the second multiplier 520, and the third multiplier 530 may be implemented as one piece of hardware. In some implementations, the second calculation circuit 500 includes an adder for changing a reference level of symbols, such as a bias voltage. For example, the second calculation circuit 500 may include adders that are respectively connected to the first multiplier 510, the second multiplier 520, and the third multiplier 530 and add or subtract additional common mode levels. In this case, each of the first multiplier 510, the second multiplier 520, and the third multiplier 530 may generate the error threshold values ET1 to ET4, or the data threshold values DT1 and DT2 by adding an additional common mode level through the adders.

In FIG. 10, a receiver that receives a signal including symbols encoded in a PAM-4 scheme described in FIG. 2B is described, but this is an example. The scope of the present disclosure is not limited thereto. The second calculation circuit 500 may include multipliers of which the number is different from the number shown in FIG. 10, or multipliers with different inputs such that the receiver 100 of FIGS. 1 to 9 corresponds to the transmission signal TSIG including symbols encoded in an arbitrary scheme.

In some of the examples described above, the absolute values of the threshold values are the same as each other, and the signs thereof are opposite to each other. However, the scope of the present disclosure is not limited thereto. For example, in at least part of the threshold values ET1 to ET4, DT1, and DT2, there may not be a pair having the same absolute value of a threshold value. As a detailed example, at least some of the threshold values may be generated by adding an arbitrary level to two threshold values, which are generated as a result of multiplying the absolute average AA and one of the threshold coefficients TCs and which have the same absolute value and opposite signs. In this case, absolute values of the two generated threshold values may be different from each other. In some implementations, each of the multipliers 510, 520, and 530 includes an additional configuration at an output terminal for applying an additional common mode level.

Figure 11:
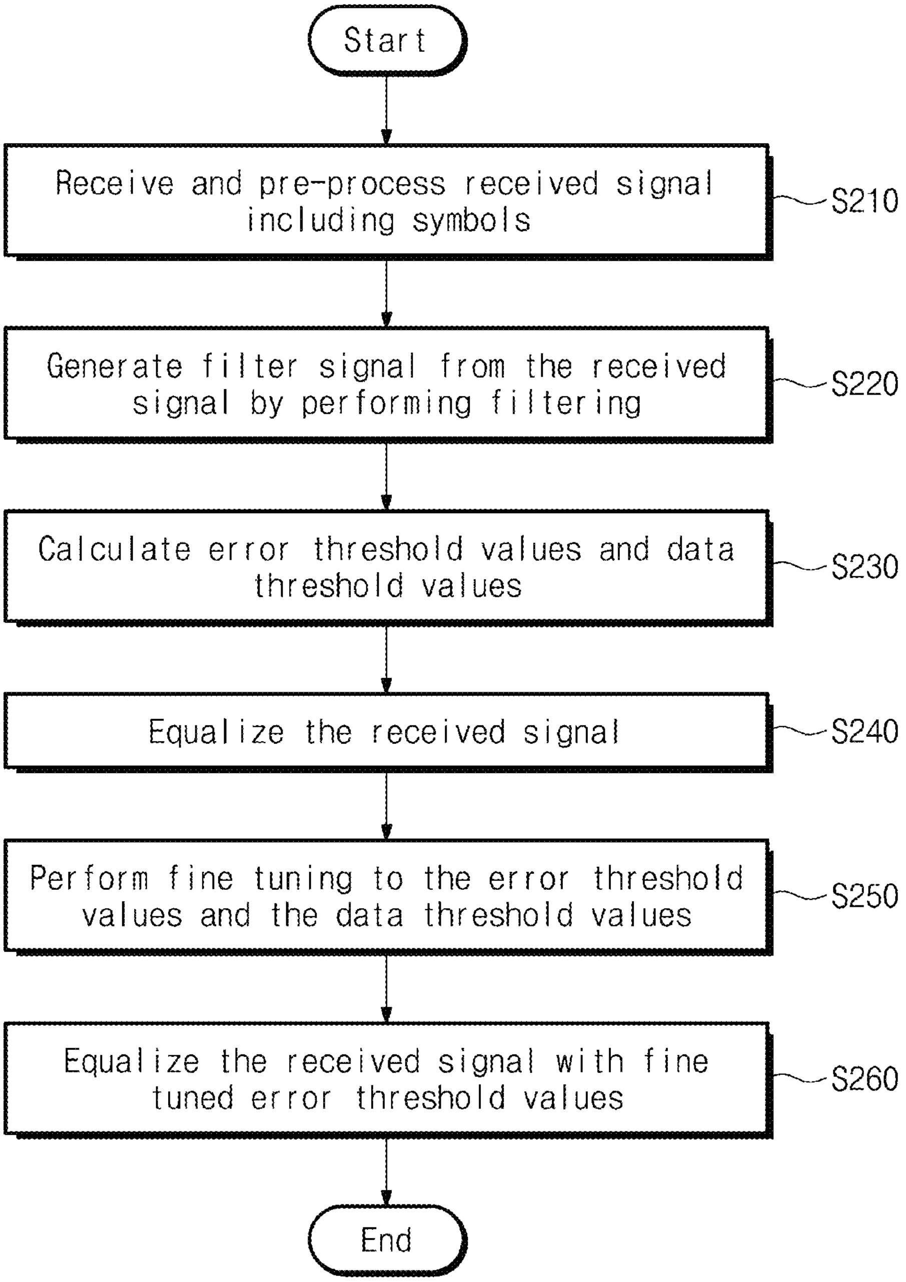
FIG. 11 is a flowchart showing an example of an operating method of a receiver.

FIG. 11 is a flowchart showing an operating method of a receiver, e.g., the receiver of FIG. 1, according to some implementations of the present disclosure. An operating method of the receiver 100 capable of finely tuning error threshold values or data threshold values, according to some implementations of the present disclosure will be described with reference to FIGS. 1 to 7, 9, and 11.

In operation S210, the receiver 100 receives and pre-processes the received signal RSIG. The operation of the receiver 100 in operation S210 may be the same as or similar to operation S110 of FIG. 8. In operation S220, the receiver 100 generates the filter signal FS by performing a filtering operation on an equalization signal (e.g., the equalization signal ES the same as the pre-processing signal PPS in FIG. 3). The operation of the receiver 100 in operation S220 may be the same as or similar to operation S120 of FIG. 8.

In operation S230, the receiver 100 calculates error threshold values and data threshold values based on the filter signal FS. For example, the receiver 100 may obtain error threshold values and data threshold values based on the absolute average AA of the filter signal FS. The operation of the receiver 100 in operation S230 may be the same as or similar to operation S130. In operation S240, the receiver 100 performs an equalizing operation of the received signal based on the error threshold values and the data threshold values. For example, the receiver 100 may restore the transmission signal TSIG by performing an equalizing operation on the pre-processing signal PPS, which is generated through the pre-processing operation of the received signal RSIG, based on the error threshold values and the data threshold values. The operation of the receiver 100 in operation S240 may be the same or similar to the operation in operation S140 of FIG. 8.

In operation S250, the receiver 100 may perform fine tuning on the error threshold values and the data threshold values. On the basis of the operation of operation S250, the receiver 100 may restore the transmission signal TSIG such that data included in the transmission signal TSIG is determined even when the linearity of the transmission signal TSIG of the transmitter 1235 of FIG. 1 is not guaranteed. In some implementations, the receiver 100 finely tunes the error threshold values included in the error threshold ET or the data threshold values included in the data threshold DT through the threshold generation block 130 of FIG. 3.

In some implementations, the threshold calculation circuit 320 of the receiver 100 performs fine tuning on the error threshold values or the data threshold values by fine tuning ratios multiplied by the absolute average AA. For example, the threshold calculation circuit 320 may change the error threshold values by (e.g., finely) tuning each of the first ratios that are multiplied by the absolute average AA and used to obtain the error threshold values. As another example, the threshold calculation circuit 320 may change the data threshold values by (e.g., finely) tuning each of the second ratios that are multiplied by the absolute average AA and used to obtain the data threshold values.

Even when an interval between pieces of amplitude of the symbols in the transmission signal TSIG is not the same or is not constant, the receiver 100 of FIG. 11 may allow the transmission signal TSIG to be restored based on appropriate fine tuning of coefficients multiplied by the absolute average AA. In some implementations, the operation of operation S250 of the receiver 100 may be performed after ISI of the equalization signal ES (or the received signal RSIG) is partially removed through operation S240. For example, the receiver 100 may reduce distortion caused by ISI of the received signal RSIG based on the operations of operations S210 to S240, and then may generate the tuned error threshold values or the tuned data threshold values through fine tuning in operation S250. Some implementations of the structure and operation of the threshold calculation circuit 320 of the threshold generation block 300 that performs operation S250 will be described with reference to FIG. 12.

In operation S260, the receiver 100 performs an equalizing operation on the received signal RSIG based on fine-tuned error threshold values. For example, the receiver 100 may perform a precise equalizing operation on the received signal RSIG, by performing an equalizing operation on the pre-processing signal PPS based on fine-tuned error threshold values. On the basis of operations S210 to S260, the receiver 100 may quickly and accurately restore the transmission signal TSIG when the linearity of the transmission signal TSIG is not guaranteed or an interval between levels of symbols of the transmission signal TSIG is not constant.

After operation S260, the receiver 100 may extract data from the equalization signal ES. In this case, the equalization signal ES may be a signal generated based on the error threshold values generated according to operations S230 and S250. In some implementations, the receiver 100 determines data of symbols through the data slicer block 150. In some implementations, the receiver 100 determines symbols or identifies or determines data, by using data threshold values. For example, the data slicer block 150 of the receiver 100 may detect symbols in the equalization signal ES by using the data threshold values DT0, DT1, and DT2 included in the data threshold DT received from the threshold generation block 130, and may determine the data included in the symbols. The data determined by the data slicer block 150 may be delivered to a serializer connected to the receiver 100, or may be delivered to the functional module 1110 or the buffer module 1120 of FIG. 1.

Figure 12:
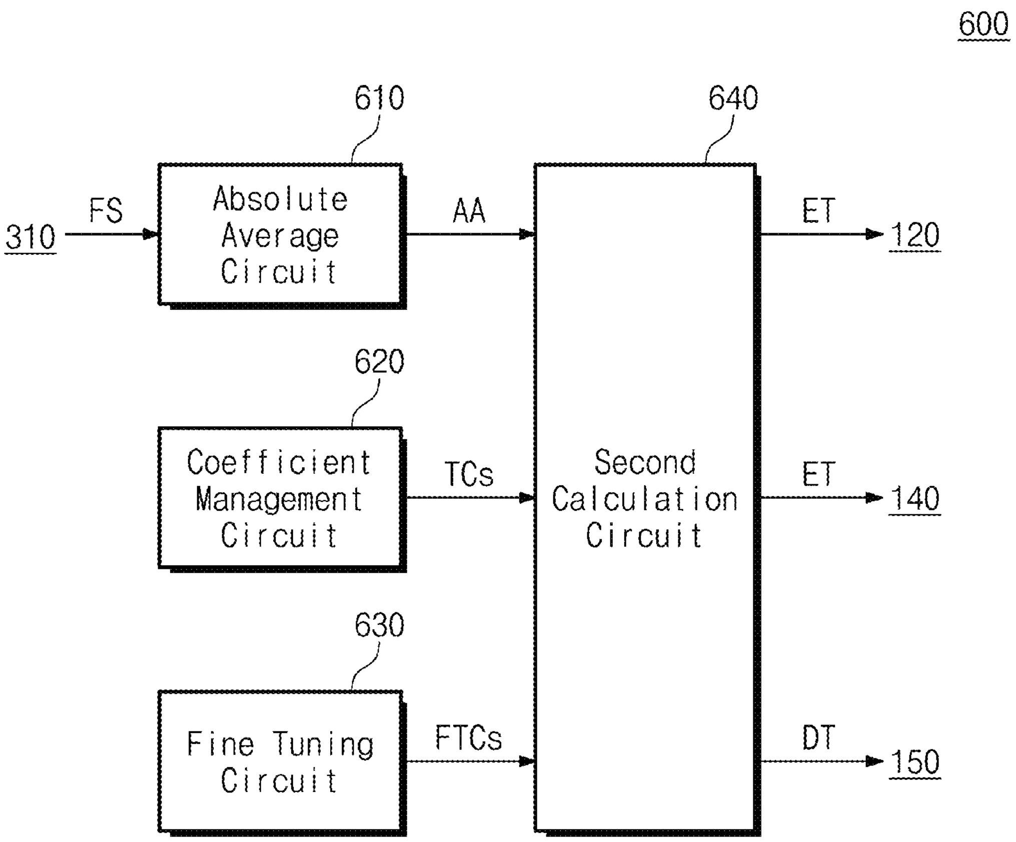
FIG. 12 is a block diagram showing an example of a threshold generation block.

FIG. 12 is a block diagram showing an example of a threshold calculation circuit, e.g., the threshold calculation circuit of FIG. 4, according to some implementations of the present disclosure. The threshold calculation circuit 600 may correspond to the threshold calculation circuit 320 of FIG. 4. Referring to FIG. 12, the threshold calculation circuit 600 may include an absolute average circuit 610, a coefficient management circuit 620, a fine tuning circuit 630, and a second calculation circuit 640. The threshold calculation circuit 600 will be described with reference to FIGS. 1 to 7, 9, 11, and 12.

The absolute average circuit 610 may receive the filter signal FS from the filter circuit 310 of FIG. 4 and may obtain the absolute average AA. The absolute average circuit 610 may be the same as or similar to the absolute average circuit 421 of FIG. 9. The absolute average circuit 610 may deliver the absolute average AA of the filter signal FS to the second calculation circuit 640.

The coefficient management circuit 620 may manage the coefficients required to generate error threshold values and data threshold values. The coefficient management circuit 620 may operate identically or similarly to the coefficient management circuit 423 of FIG. 9. The coefficient management circuit 620 may deliver the threshold coefficients TCs to the second calculation circuit 640.

The fine tuning circuit 630 may manage coefficients for finely tuning threshold values. The fine tuning circuit 630 may allow the receiver 100 of FIG. 11 to perform fine tuning on the error threshold values or the data threshold values. In some implementations, the fine tuning circuit 630 generates fine tuning coefficients FTCs used to finely tune the error threshold values and the data threshold values, based on characteristics of the received signal RSIG and according to one or more suitable schemes. In some implementations, the fine tuning circuit 630 manages the fine tuning coefficients FTCs received from the functional module 1110 of FIG. 1. The fine tuning circuit 630 may allow the transmission signal TSIG to be restored even when the linearity of the transmitter 1135 is not guaranteed (e.g., when intervals between pieces of amplitude of symbols are not constant). For example, the fine tuning circuit 630 may provide the fine tuning coefficients FTCs to the second calculation circuit 640 such that the error threshold values are tuned precisely, and a bit error rate (BER) of data generated based on the received signal RSIG is lowered.

In some implementations, the receiver 100 includes the threshold calculation circuit 600 of FIG. 12 and performs fine tuning on the error threshold values and the data threshold values through the fine tuning circuit 630. For example, the receiver 100 may generate the fine tuning coefficients FTCs according to the properties of the transmission signal TSIG through the fine tuning circuit 630 such that the generated fine tuning coefficients FTCs are reflected to generate the error threshold values and the data threshold values. The receiver 100 may restore the transmission signal TSIG precisely based on the operation of operation S250.

The second calculation circuit 640 may generate the error threshold ET and the data threshold DT. In some implementations, the second calculation circuit 640 generates the error threshold ET and the data threshold DT based on the absolute average AA, the threshold coefficients TCs, and the fine tuning coefficients FTCs. For example, the second calculation circuit 640 may calculate and generate the error threshold values and the data threshold values based on the absolute average AA, the threshold coefficients TCs, and the fine tuning coefficients FTCs. The second calculation circuit 640 may deliver the error threshold ET, which includes the error threshold values, to the equalization block 120 and the clock generation block 140 of FIG. 3. Likewise, the second calculation circuit 640 may deliver the data threshold DT, which includes the data threshold values, to the data slicer block 150 in FIG. 3. The second calculation circuit 640 will be described in detail with reference to FIG. 13.

Figure 13:
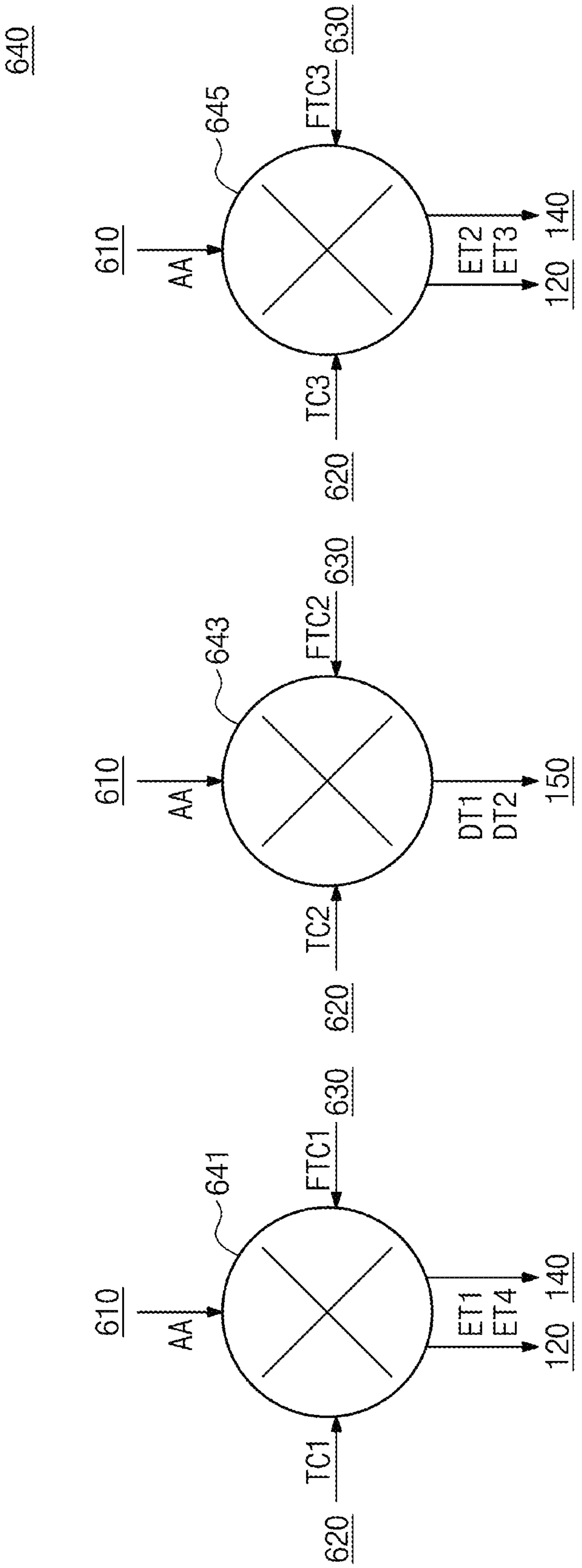
FIG. 13 is a diagram showing an example of a second calculation circuit.

FIG. 13 is a block diagram showing an example of the second calculation circuit of FIG. 12, according to some implementations of the present disclosure. Referring to FIG. 13, a second calculation circuit 640 may include a first multiplier 641, a second multiplier 643, and a third multiplier 645. The second calculation circuit 640 according to some implementations of the present disclosure will be described in detail with reference to FIGS. 11 to 13.

The first multiplier 641, the second multiplier 643, and the third multiplier 645 may perform multiplication between an absolute average, threshold coefficients, and fine tuning coefficients. In some implementations, the first multiplier 641, the second multiplier 643, and the third multiplier 645 may output results having the same absolute value and opposite signs, based on the results of multiplication between input values. The inputs and the output of the first multiplier 641, the second multiplier 643, and the third multiplier 645 described below are examples. Modifications and combinations thereof should also be understood to fall within the scope of the present disclosure.

Referring to FIG. 13, the first multiplier 641 may receive the absolute average AA, the first threshold coefficient TC1, and a first fine tuning coefficient FTC1 as inputs. For example, the first multiplier 641 may receive the absolute average AA from the absolute average circuit 610 of FIG. 11, may receive the first threshold coefficient TC1 from the coefficient management circuit 620 of FIG. 11, and may receive the first fine tuning coefficient FTC1 from the fine tuning circuit 630 of FIG. 11. In some implementations, the first multiplier 641 multiplies the absolute average AA with the sum of the first threshold coefficient TC1 and the first fine tuning coefficient FTC1. In some implementations, the first multiplier 641 adds the product of the absolute average AA and the first threshold coefficient TC1, to the product of the absolute average AA and the first fine tuning coefficient FTC1. The first multiplier 641 may output the first error threshold value ET1 and the fourth error threshold value ET4 of FIG. 7 based on the calculation result. The first multiplier 641 may provide the generated first error threshold value ET1 and the generated fourth error threshold value ET4 to the equalization block 120 and the clock generation block 140 of FIG. 3.

Likewise, the second multiplier 643 may receive the absolute average AA from the absolute average circuit 610, the second threshold coefficient TC2 received from the coefficient management circuit 620, and a second fine tuning coefficient FTC2 received from the fine tuning circuit 630 as inputs. The second multiplier 643 may multiply the absolute average AA with the sum of the second threshold coefficient TC2 and the second fine tuning coefficient FTC2, or may generate the sum of the product of the absolute average AA and the second threshold coefficient TC2 and the product of the absolute average AA and the second fine tuning coefficient FTC2. The second multiplier 643 may obtain the first data threshold value DT1 and the second data threshold value DT2 in FIG. 7 based on the calculation results. The second multiplier 643 may deliver the generated first data threshold value DT1 and the generated second data threshold value DT2 to the data slicer block 150 in FIG. 3.

The third multiplier 645 may receive the absolute average AA from the absolute average circuit 610, the third threshold coefficient TC3 from the coefficient management circuit 620, and a third fine tuning coefficient FTC3 from the fine tuning circuit 630 as inputs. The third multiplier 645 may multiply the absolute average AA with the sum of the third threshold coefficient TC3 and the third fine tuning coefficient FTC3, or may generate the sum of the product of the absolute average AA and the third threshold coefficient TC3 and the product of the sum of the absolute average AA and the third fine tuning coefficient FTC3. The third multiplier 645 may obtain the second error threshold value ET2 and the third error threshold value ET3 of FIG. 7 based on the calculation result. The third multiplier 645 may provide the generated second error threshold value ET2 and the generated third error threshold value ET3 to the equalization block 120 and the clock generation block 140 of FIG. 3.

The first multiplier 641, the second multiplier 643, and the third multiplier 645 shown and described in FIG. 13 are classified according to functions, operations, or operating unit. The scope of the present disclosure is not limited to the foregoing classifications/divisions. In some implementations, at least some or all of the first multiplier 641, the second multiplier 643, and the third multiplier 645 are implemented as one piece of hardware. In some implementations, the second calculation circuit 640 includes an adder for changing a reference level of symbols, such as a bias voltage.

In some of the foregoing examples, it is described that the absolute values of the threshold values are the same as each other, and the signs thereof are opposite to each other. However, the scope of the present disclosure is not limited thereto. For example, in at least part of the threshold values ET1 to ET4, DT1, and DT2, there may not be a pair having the same absolute value of a threshold value. As a detailed example, at least some of the threshold values may be generated by adding an arbitrary level to two threshold values, which are generated as a result of multiplying the absolute average AA and one of the threshold coefficients TCs and multiplying the absolute average AA and one of the fine tuning coefficients FTCs and which have the same absolute value and opposite signs. In this case, absolute values of the two threshold values may be different from each other. In some implementations, each of the multipliers 641, 643, and 645 may further include a configuration or circuitry capable of applying an additional common mode level in an output terminal. In this case, each of the first multiplier 641, the second multiplier 643, and the third multiplier 645 may generate the error threshold values ET1 to ET4, or the data threshold values DT1 and DT2 by adding an additional common mode level to output levels through an adder.

In FIG. 13, a receiver that receives a signal including symbols encoded in a PAM-4 scheme described in FIG. 2B is described, but this is an example. The scope of the present disclosure is not limited thereto. The second calculation circuit 640 may include multipliers, of which the number is different from the number shown in FIG. 13, or multipliers with different inputs such that the receiver 100 of FIGS. 1 to 9, 11 and 12 corresponds to the transmission signal TSIG including symbols encoded in an arbitrary scheme.

It is described that the receiver (or the operations of the receiver) described with reference to FIGS. 9 to 13 restores the transmission signal TSIG including symbols generated by the coding scheme of FIG. 2B. However, the scope of the present disclosure is not limited thereto. It should be understood that implementations in which a receiver restoring the transmission signal TSIG including symbols generated by another coding scheme (e.g., PAM-8, etc.) is implemented in an identical or similar manner to the described with reference to FIGS. 9 to 13 falls within the scope of the present disclosure.

Figure 14:
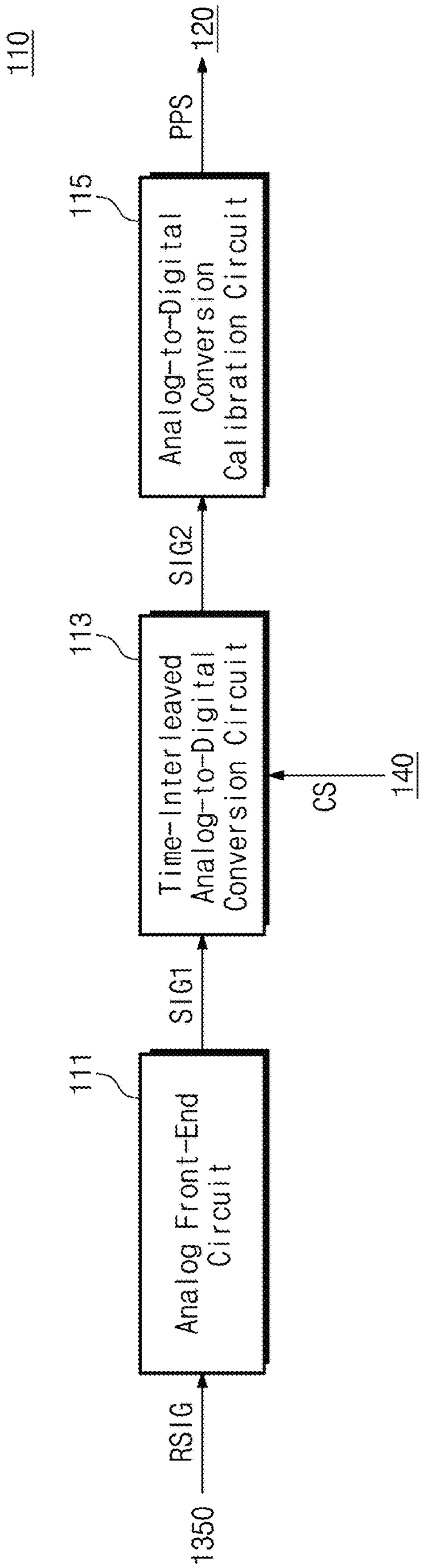
FIG. 14 is a block diagram showing an example of a pre-processing block.

FIG. 14 is a block diagram showing an example of a pre-processing block, e.g., the pre-processing block of FIG. 3, in detail, according to some implementations of the present disclosure. Referring to FIG. 14, the pre-processing block 110 may include an analog front-end circuit 111, a time-interleaved analog-to-digital conversion circuit 113, and an analog-to-digital conversion calibration circuit 115. The pre-processing block will be described in detail with reference to FIGS. 3 and 14.

The analog front-end circuit 111 may receive the received signal RSIG and may perform analog preprocessing on the received signal RSIG. In some implementations, the analog front-end circuit 111 is connected to the channel 1350 connected to the receiver 100. For example, the analog front-end circuit 111 may be connected to the channel 1350 to receive the received signal RSIG. In some implementations, the received signal RSIG received by the analog front-end circuit 111 may be an analog signal.

In some implementations, the analog front-end circuit 111 includes one or more amplifiers. For example, the analog front-end circuit 111 may include an analog amplification circuit or an analog processing circuit. As a detailed example, the analog front-end circuit 111 may include continuous time linear equalization (CTLE), or a variable gain amplifier (VGA), and may amplify a signal of an area including symbols or data of the transmission signal TSIG in a frequency band among the received signal RSIG. The analog front-end circuit 111 may generate a first signal SIG1 based on an analog pre-processing operation and may deliver the generated first signal SIG1 to the time-interleaved analog-to-digital conversion circuit 113.

The time-interleaved analog-to-digital conversion circuit 113 may generate a second signal SIG2 by digitally converting the first signal SIG1. In some implementations, the second signal SIG2 is a signal generated by sampling the first signal SIG1 based on the clock signal CS received from the clock generation block 140 of FIG. 3. In some implementations, the time-interleaved analog-to-digital conversion circuit 113 may perform time-interleaved analog-to-digital conversion. For example, the time-interleaved analog-to-digital conversion circuit 113 may include a plurality of lower analog-to-digital conversion circuits to perform digital conversion of the first signal SIG1 based on a time-interleaving scheme. The time-interleaved analog-to-digital conversion circuit 113 may deliver the generated second signal SIG2 to the analog-to-digital conversion calibration circuit 115.

The analog-to-digital conversion calibration circuit 115 may calibrate the deviation of the second signal SIG2. In some implementations, the analog-to-digital conversion calibration circuit 115 calibrates the deviation of the digital conversion of the lower analog-to-digital conversion circuits included in the time-interleaved analog-to-digital conversion circuit 113. For example, the analog-to-digital conversion calibration circuit 115 may calibrate the deviation between second signals SIG2 of the lower analog-to-digital conversion circuits of the time-interleaved analog-to-digital conversion circuit 113, and may calibrate the deviation according to a voltage temperature variation (PVT) process. The analog-to-digital conversion calibration circuit 115 may process the second signal SIG2 so as to be the same as or similar to performing the digital conversion of the first signal SIG1 in one analog-to-digital conversion circuit based on the calibration operation. The analog-to-digital conversion calibration circuit 115 may generate the pre-processing signal PPS from the second signal SIG2, and may deliver the generated pre-processing signal PPS to the equalization block 120 of FIG. 3.

The pre-processing block 110 described with reference to FIG. 14 is an example, and the scope of the present disclosure is not limited thereto. Each of the circuits 111, 113, and 115 of the pre-processing block 110 of FIG. 14 may be classified or reconfigured depending on functions or operations. For example, all of the circuits 111, 113, and 115 of the pre-processing block 110 may be implemented as one integrated circuit, or may be implemented so as to be divided into at least two or more chips, circuits, or integrated circuits.

Figure 15:
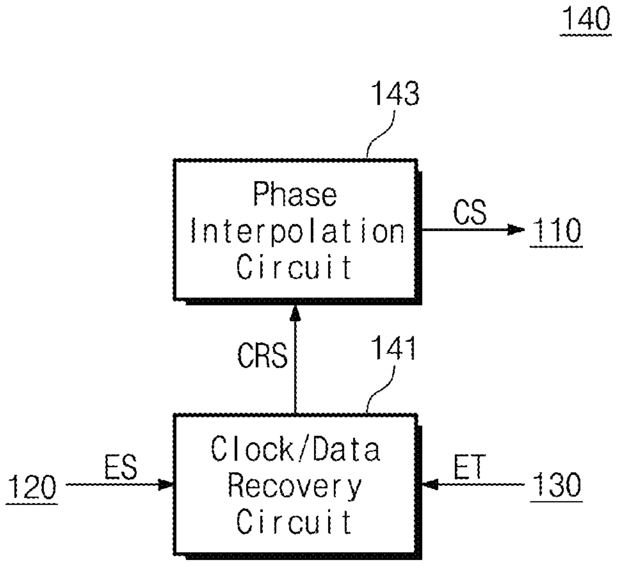
FIG. 15 is a block diagram showing an example of a clock generation block.

FIG. 15 is a block diagram showing the clock generation block 140 of FIG. 3 in detail, according to some implementations of the present disclosure. Referring to FIG. 15, the clock generation block 140 includes a clock/data recovery circuit 141 and a phase interpolation circuit 143. The clock generation block 140 will be described with reference to FIGS. 3, 7, and 15.

The clock/data recovery circuit 141 may adjust the timing of generating the clock signal CS. In some implementations, the clock/data recovery circuit 141 delivers a clock recovery signal CRS to the phase interpolation circuit 143 so as to adjust the clock generation timing. In some implementations, the clock/data recovery circuit 141 generates the clock recovery signal CRS based on comparison of the equalization signal ES and the error threshold ET. For example, the clock/data recovery circuit 141 may be a minimum mean square error-CDR (MMSE-CDR) circuit. The clock/data recovery circuit 141 may receive the equalization signal ES from the equalization block 120 of FIG. 3, and may receive the error threshold ET from the threshold generation block 130 of FIG. 3.

In some implementations, the clock/data recovery circuit 141 generates the clock recovery signal CRS based on comparison of the equalization signal ES and the error threshold ET. For example, the clock/data recovery circuit 141 may generate the clock recovery signal CRS based on the comparison in level between the equalization signal ES and an error threshold value corresponding to the equalization signal ES among the error threshold ET.

The phase interpolation circuit 143 may generate the clock signal CS based on the clock recovery signal CRS. In some implementations, the phase interpolation circuit 143 adjusts a rising edge timing or a falling edge timing of the clock signal CS based on the clock recovery signal CRS. In some implementations, the phase interpolation circuit 143 generates a plurality of clock signals and may generate the clock signal CS by combining the plurality of clock signals in response to the clock recovery signal CRS. The phase interpolation circuit 143 may deliver the generated clock signal CS to the pre-processing block 110 of FIG. 3. For example, the phase interpolation circuit 143 may provide the generated clock signal to the time-interleaved analog-to-digital conversion circuit 113 of FIG. 14.

Figure 16:
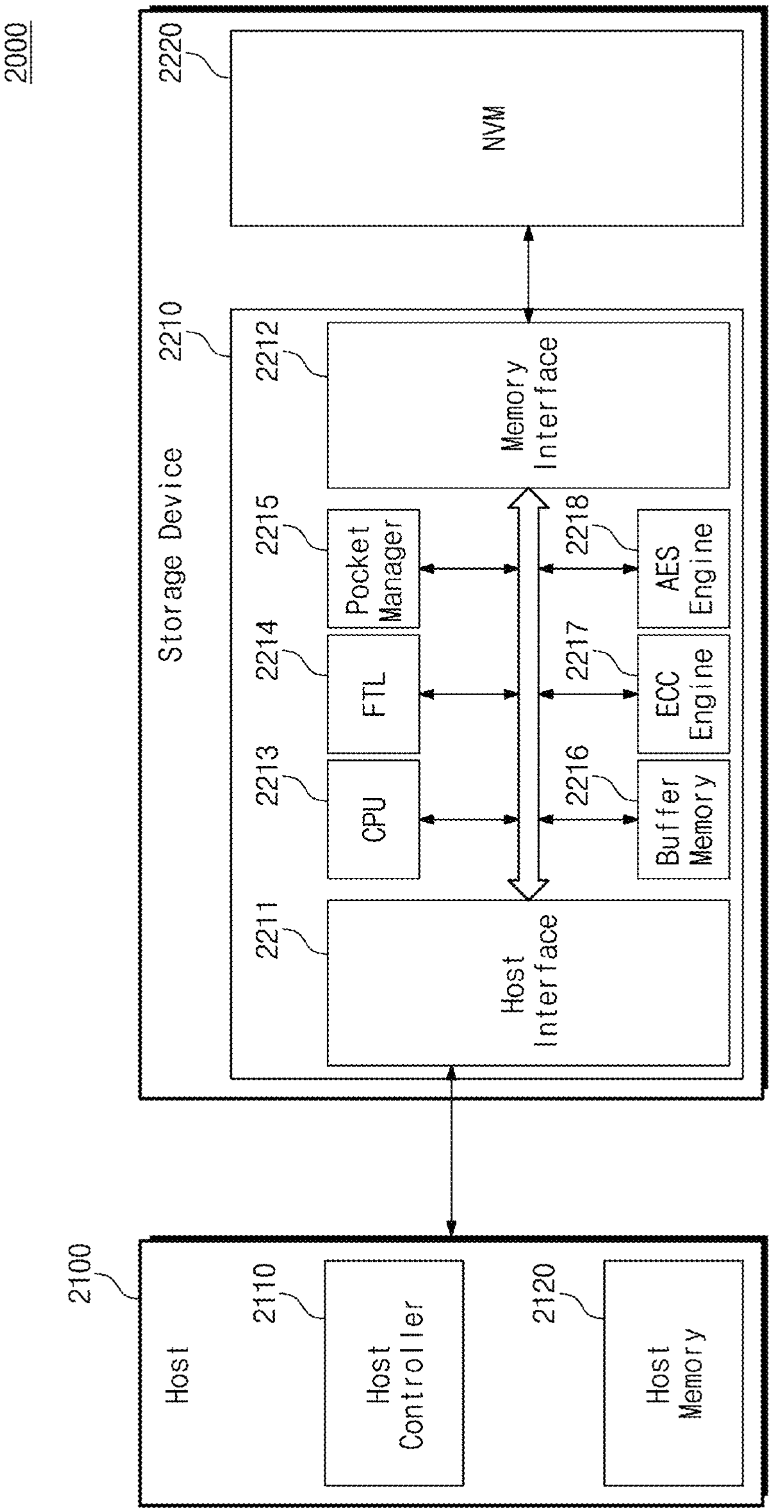
FIG. 16 is a block diagram illustrating an example of a host-storage system.

FIG. 16 is a block diagram of a host storage system 2000 according to some implementations of the present disclosure. The host storage system 2000 may include a host 2100 and a storage device 2200. Further, the storage device 2200 may include a storage controller 2210 and an NVM 2220.

According to some implementations, the host 2100 may include a host controller 2110 and a host memory 2120. The host memory 2120 may serve as a buffer memory configured to temporarily store data to be transmitted to the storage device 2200 or data received from the storage device 2200.

In some implementations, the communication between the host 2100 and the storage device 2200 may be performed by using the scheme described with reference to FIGS. 1 to 15. For example, the host 2100 may be the second electronic device 1200 of FIG. 1; the storage device 2200 may be the first electronic device 1100 in FIG. 1; and the host interface 2211 may be the communication module 1130 of FIG. 1.

The storage device 2200 may include storage media configured to store data in response to requests from the host 2100. As an example, the storage device 2200 may include at least one of an SSD, an embedded memory, and a removable external memory. When the storage device 2200 is an SSD, the storage device 2200 may be a device that conforms to an NVMe standard. When the storage device 2200 is an embedded memory or an external memory, the storage device 2200 may be a device that conforms to a UFS standard or an eMMC standard. Each of the host 2100 and the storage device 2200 may generate a packet according to an adopted standard protocol and transmit the packet.

When the NVM 2220 of the storage device 2200 includes a flash memory, the flash memory may include a 2D NAND memory array or a 3D (or vertical) NAND (VNAND) memory array. As another example, the storage device 2200 may include various other kinds of NVMs. For example, the storage device 2200 may include magnetic RAM (MRAM), spin-transfer torque MRAM, conductive bridging RAM (CBRAM), ferroelectric RAM (FRAM), PRAM, RRAM, and various other kinds of memories.

According to some implementations, the host controller 2110 and the host memory 2120 may be implemented as separate semiconductor chips. In some implementations, the host controller 2110 and the host memory 2120 may be integrated in the same semiconductor chip. As an example, the host controller 2110 may be any one of a plurality of modules included in an application processor (AP). The AP may be implemented as a System on Chip (SoC). Further, the host memory 2120 may be an embedded memory included in the AP or an NVM or memory module located outside the AP.

The host controller 2110 may manage an operation of storing data (e.g., write data) of a buffer region of the host memory 2120 in the NVM 2220 or an operation of storing data (e.g., read data) of the NVM 2220 in the buffer region.

The storage controller 2210 may include a host interface 2211, a memory interface 2212, and a CPU 2213. Further, the storage controller 2210 may further include a flash translation layer (FTL) 2214, a packet manager 2215, a buffer memory 2216, an error correction code (ECC) engine 2217, and an advanced encryption standard (AES) engine 2218. The storage controller 2210 may further include a working memory (not shown) in which the FTL 2214 is loaded. The CPU 2213 may execute the FTL 2214 to control data write and read operations on the NVM 2220.

The host interface 2211 may transmit and receive packets to and from the host 2100. A packet transmitted from the host 2100 to the host interface 2211 may include a command or data to be written to the NVM 2220. A packet transmitted from the host interface 2211 to the host 2100 may include a response to the command or data read from the NVM 2220. The memory interface 2212 may transmit data to be written to the NVM 2220 to the NVM 2220 or receive data read from the NVM 2220. The memory interface 2212 may be configured to comply with a standard protocol, such as Toggle or open NAND flash interface (ONFI).

The FTL 2214 may perform various functions, such as an address mapping operation, a wear-leveling operation, and a garbage collection operation. The address mapping operation may be an operation of converting a logical address received from the host 2100 into a physical address used to actually store data in the NVM 2220. The wear-leveling operation may be a technique for preventing excessive deterioration of a specific block by allowing blocks of the NVM 2220 to be uniformly used. As an example, the wear-leveling operation may be implemented using a firmware technique that balances erase counts of physical blocks. The garbage collection operation may be a technique for ensuring usable capacity in the NVM 2220 by erasing an existing block after copying valid data of the existing block to a new block.

The packet manager 2215 may generate a packet according to a protocol of an interface, which consents to the host 2100, or parse various types of information from the packet received from the host 2100. In addition, the buffer memory 2216 may temporarily store data to be written to the NVM 2220 or data to be read from the NVM 2220. Although the buffer memory 2216 may be a component included in the storage controller 2210, the buffer memory 2216 may be outside the storage controller 2210.

The ECC engine 2217 may perform error detection and correction operations on read data read from the NVM 2220. More specifically, the ECC engine 2217 may generate parity bits for write data to be written to the NVM 2220, and the generated parity bits may be stored in the NVM 2220 together with write data. During the reading of data from the NVM 2220, the ECC engine 2217 may correct an error in the read data by using the parity bits read from the NVM 2220 along with the read data, and output error-corrected read data.

The AES engine 2218 may perform at least one of an encryption operation and a decryption operation on data input to the storage controller 2210 by using a symmetric-key algorithm.

Accordingly, receivers may quickly and accurately restore transmission signals lost due to ISI or noise, and quickly and accurately calculate threshold values for restoring signals, e.g., even when an eye on an eye diagram is closed.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

The above description refers to various examples for carrying out the present disclosure. The scope of the present disclosure includes implementations that include changes to the above. While the present disclosure has been described with reference to various examples, it will be apparent to those of ordinary skill in the art that various changes and modifications may be made thereto without departing from the spirit and scope of the present disclosure.

What is claimed is:

1. A receiver comprising:

a pre-processing circuit configured to pre-process a received signal from an external transmitter, to generate a pre-processing signal;

an equalization circuit configured to perform equalization on the pre-processing signal to generate an equalization signal, based on a plurality of error threshold values; and a threshold generation circuit configured to generate the plurality of error threshold values and a plurality of data threshold values, wherein the threshold generation circuit is configured to:

generate a delay signal by delaying the equalization signal by a unit time interval, generate a filter signal by subtracting the delay signal from the equalization signal, and generate the plurality of error threshold values and the plurality of data threshold values based on the filter signal.

2. The receiver of claim 1, further comprising a data slicer circuit configured to:

receive the equalization signal and the plurality of data threshold values; and determine data of the equalization signal based on the plurality of data threshold values.

3. The receiver of claim 1, wherein the received signal is a random signal.

4. The receiver of claim 1, wherein the threshold generation circuit is configured to:

obtain an absolute average of the filter signal;

generate the plurality of error threshold values by multiplying the absolute average of the filter signal by at least one first ratio; and generate the data threshold values by multiplying the absolute average of the filter signal by a plurality of second ratios.

5. The receiver of claim 1, wherein the received signal includes symbols encoded in a pulse amplitude modulation-4 scheme.

6. The receiver of claim 1, wherein the threshold generation circuit includes:

a filter circuit configured to generate the filter signal from the equalization signal; and a threshold calculation circuit configured to generate the plurality of error threshold values and the plurality of data threshold values from the filter signal.

7. The receiver of claim 6, wherein the threshold calculation circuit includes:

an absolute average circuit configured to calculate an absolute average of the filter signal;

a coefficient management circuit configured to manage a plurality of threshold coefficients, the plurality of threshold coefficients including at least one first ratio between the absolute average of the filter signal and the plurality of error threshold values, and a plurality of second ratios between the absolute average of the filter signal and the plurality of data threshold values; and a second calculation circuit configured to generate the plurality of error threshold values and the plurality of data threshold values based on the plurality of threshold coefficients and the absolute average of the filter signal.

8. The receiver of claim 7, wherein the plurality of threshold coefficients include a first threshold coefficient, a second threshold coefficient, and a third threshold coefficient, wherein the plurality of data threshold values include a 0-th data threshold value, a first data threshold value, and a second data threshold value, wherein the 0-th data threshold value is equal to a common mode level of the received signal, wherein the second calculation circuit includes:

a first multiplier configured to generate a first error threshold value and a second error threshold value by multiplying the first threshold coefficient with the absolute average of the filter signal;

a second multiplier configured to calculate a third error threshold value and a fourth error threshold value by multiplying the second threshold coefficient with the absolute average of the filter signal; and a third multiplier configured to obtain the first data threshold value and the second data threshold value by multiplying the third threshold coefficient with the absolute average of the filter signal, wherein the first error threshold value, the second error threshold value, the third error threshold value, and the fourth error threshold value are included in the plurality of error threshold values, wherein the first error threshold value and the second error threshold value have the same absolute value as each other and opposite signs to each other, wherein the third error threshold value and the fourth error threshold value have the same absolute value as each other and opposite signs to each other, and wherein the first data threshold value and the second data threshold value have the same absolute value as each other and opposite signs to each other.

9. The receiver of claim 7, wherein the threshold calculation circuit includes:

a fine-tuning circuit configured to manage a plurality of fine-tuning coefficients and to provide the plurality of fine-tuning coefficients to the second calculation circuit, and wherein the second calculation circuit is configured to use the plurality of fine-tuning coefficients to fine-tune the plurality of error threshold values and the plurality of data threshold values.

10. The receiver of claim 9, wherein the plurality of threshold coefficients include a first threshold coefficient, a second threshold coefficient, and a third threshold coefficient, wherein the plurality of fine-tuning coefficients include a first fine-tuning coefficient, a second fine-tuning coefficient, and a third fine-tuning coefficient, wherein the second calculation circuit includes:

a first multiplier configured to generate a first error threshold value and a second error threshold value by multiplying the absolute average of the filter signal with a sum of the first threshold coefficient and the first fine-tuning coefficient;

a second multiplier configured to generate a third error threshold value and a fourth error threshold value by multiplying the absolute average of the filter signal with a sum of the second threshold coefficient and the second fine-tuning coefficient; and a third multiplier configured to generate a first data threshold value of the plurality of data threshold values and a second data threshold value of the plurality of data threshold values, by multiplying the absolute average of the filter signal with a sum of the third threshold coefficient and the third fine-tuning coefficient, and wherein the first error threshold value, the second error threshold value, the third error threshold value, and the fourth error threshold value are included in the plurality of error threshold values.

11. The receiver of claim 1, wherein the pre-processing circuit includes:

an analog front-end circuit configured to receive the received signal and to generate a first signal by performing analog preprocessing on the received signal;

a time-interleaved analog-to-digital conversion circuit configured to generate a second signal by performing digital conversion on the first signal; and an analog-to-digital conversion calibration circuit configured to generate the pre-processing signal from the second signal by calibrating a deviation of each of a plurality of analog-to-digital circuits included in the time-interleaved analog-to-digital conversion circuit.

12. The receiver of claim 11, further comprising:

a clock generation circuit configured to generate a clock signal used for operation of the pre-processing circuit, wherein the clock generation circuit includes:

a clock/data recovery circuit configured to generate a clock recovery signal based on the equalization signal and the plurality of error threshold values; and a phase interpolation circuit configured to generate the clock signal based on the clock recovery signal, and wherein the clock generation circuit is configured to provide the clock signal to the time-interleaved analog-to-digital conversion circuit.

13. An operation method of a receiver, the method comprising:

generating a pre-processing signal by pre-processing a received signal from an external device;

generating a delay signal by delaying the pre-processing signal by a unit time interval;

generating a filter signal from the pre-processing signal by subtracting the delay signal from the pre-processing signal;

generating a plurality of error threshold values and a plurality of data threshold values based on the filter signal; and performing an equalizing operation on the pre-processing signal based on the plurality of error threshold values.

14. The method of claim 13, wherein the received signal is a random signal.

15. The method of claim 13, further comprising:

generating an equalization signal based on the equalizing operation; and determining data included in the equalization signal based on the plurality of data threshold values.

16. The method of claim 14, wherein the plurality of error threshold values are generated by multiplying an absolute average of the filter signal with at least one first ratio, and wherein the plurality of data threshold values are generated by multiplying the absolute average of the filter signal with a plurality of second ratios.

17. The method of claim 16, further comprising:

performing fine-tuning on the plurality of error threshold values and the plurality of data threshold values; and performing the equalizing operation based on the fine-tuned plurality of error threshold values.

18. The method of claim 17, wherein the fine-tuned plurality of error threshold values are generated by fine-tuning the at least one first ratio multiplied by the absolute average of the filter signal, and wherein the fine-tuned plurality of data threshold values are generated by on fine-tuning the plurality of second ratios multiplied by the absolute average of the filter signal.

19. The method of claim 18, wherein the received signal comprises symbols encoded in a pulse amplitude modulation-4 scheme, wherein the plurality of error threshold values include a first error threshold value, a second error threshold value, a third error threshold value, and a fourth error threshold value, and wherein the at least one first ratio includes a first threshold coefficient and a second threshold coefficient, wherein the first error threshold value and the second error threshold value are generated based on a product of the absolute average of the filter signal and the first threshold coefficient, wherein the first error threshold value and the second error threshold value have the same absolute value and opposite signs, and wherein the third error threshold value and the fourth error threshold value are generated based on a product of the absolute average of the filter signal and the second threshold coefficient, wherein the third error threshold value and the fourth error threshold value have the same absolute value and opposite signs.

20. An electronic device comprising:

a functional module configured to control the electronic device and to perform a function of the electronic device;

a buffer module configured to store data and a program used in operation of the functional module; and a communication module configured to communicate with another electronic device, the communication module including a transmitter and a receiver, wherein the receiver includes:

a pre-processing circuit configured to pre-process a received signal from the other electronic device to generate a pre-processing signal, an equalization circuit configured to generate an equalization signal based on the pre-processing signal and a plurality of error threshold values, and a threshold generation block configured to generate the plurality of error threshold values and a plurality of data threshold values, and wherein the threshold generation block is configured to:

generate a delay signal by delaying the equalization signal by a unit time interval, generate a filter signal by subtracting the delay signal from the equalization signal, and generate the plurality of error threshold values and the plurality of data threshold values based on the filter signal.

* * * * *